United States Patent

Okamoto et al.

(10) Patent No.: US 10,836,834 B2
(45) Date of Patent: Nov. 17, 2020

(54) SEPARATING AGENT FOR OPTICAL ISOMER

(71) Applicant: DAICEL CORPORATION, Osaka (JP)

(72) Inventors: Yoshio Okamoto, Nagoya (JP); Chiyo Yamamoto, Suzuka (JP); Tomoyuki Ikai, Nagoya (JP); Masami Kamigaito, Nagoya (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 15/217,519

(22) Filed: Jul. 22, 2016

(65) Prior Publication Data

US 2016/0326267 A1 Nov. 10, 2016

Related U.S. Application Data

(62) Division of application No. 12/450,947, filed as application No. PCT/JP2008/058421 on May 2, 2008, now abandoned.

(30) Foreign Application Priority Data

May 7, 2007 (JP) ................ 2007-122843

(51) Int. Cl.

| C08B 3/14 | (2006.01) |
|---|---|
| B01J 20/285 | (2006.01) |
| B01J 20/286 | (2006.01) |
| B01J 20/29 | (2006.01) |
| C08B 33/00 | (2006.01) |
| B01J 20/26 | (2006.01) |
| C08B 15/05 | (2006.01) |

(52) U.S. Cl.
CPC .............. *C08B 3/14* (2013.01); *B01J 20/265* (2013.01); *B01J 20/285* (2013.01); *B01J 20/286* (2013.01); *B01J 20/29* (2013.01); *C08B 15/05* (2013.01); *C08B 33/00* (2013.01)

(58) Field of Classification Search
CPC .............. C08B 3/14; C08B 33/00; C08B 1/00
USPC .......................................... 536/53, 56, 123.1
See application file for complete search history.

(56) References Cited

U.S. PATENT DOCUMENTS

| 4,818,394 A | 4/1989 | Okamoto et al. |
|---|---|---|
| 4,861,872 A | 8/1989 | Okamoto et al. |
| 4,912,205 A | 3/1990 | Okamoto et al. |
| RE34,457 E | 11/1993 | Okamoto et al. |
| 5,354,852 A | 10/1994 | Ikeda |
| 5,811,532 A | 9/1998 | House |
| 6,346,616 B1 | 2/2002 | Duval |
| RE38,435 E | 2/2004 | Okamoto et al. |
| 7,399,409 B2 | 7/2008 | Onishi et al. |
| 2002/0058763 A1 | 5/2002 | Duval |
| 2004/0262229 A1 | 12/2004 | Okamoto et al. |
| 2006/0219615 A1 | 10/2006 | Okamoto et al. |
| 2007/0084796 A1 | 4/2007 | Onishi et al. |
| 2008/0167460 A1 | 7/2008 | Okamoto et al. |
| 2009/0124798 A1 | 5/2009 | Okamoto et al. |

FOREIGN PATENT DOCUMENTS

| EP | 0 985 681 A1 | 3/2000 | |
|---|---|---|---|
| EP | 0 985 682 A1 | 3/2000 | |
| EP | 1 500 430 A2 | 1/2005 | |
| EP | 1 637 864 A1 | 3/2006 | |
| EP | 2 031 388 A1 | 3/2009 | |
| JP | 06-91956 B2 | 9/1982 | |
| JP | 2000-86702 | 3/2000 | |
| JP | 2000-86703 | 3/2000 | |
| JP | 2002052814 A * | 2/2002 | |
| JP | 2005-17268 | 1/2005 | |
| WO | WO 2004/086029 A1 | 10/2004 | |
| WO | WO 2007/129659 A1 | 11/2007 | |
| WO | WO-2010036344 A2 * | 4/2010 | .............. A61K 8/24 |

OTHER PUBLICATIONS

Chen et al ("Synthesis of covalently bonded cellulose derivative chiral stationary phases with a bifunctional reagent of 3-(triethoxysilyl)propyl isocyanate", Journal of Chromatography A, 1010 (2003), pp. 185-194).*
Improved Procedure for Preparation of Covalently Bonded Cellulose Tris-phenylcarbamate Chiral Stationary Phases, by Feng Qin et al, Chinese Journal of Chemistry, 2005, vol. 23, pp. 885-889.
Hedge et al, Applied Surface Science, 2006, 253, 1566-1572.
Loy et al, Chemical Review, 1995, 95, 1431-1442.
Chen et al, Journal of Chromatography A, 2003, vol. 1010, No. 2, pp. 185-194.
Ikai et al, Polymer Journal, 2006, vol. 38, No. 2, pp. 91-108.

* cited by examiner

*Primary Examiner* — Shaojia A Jiang
*Assistant Examiner* — Everett White
(74) *Attorney, Agent, or Firm* — Flynn Thiel, P.C.

(57) ABSTRACT

Provided is a complex obtained by reacting a polymer compound derivative obtained by modifying part of the hydroxy groups or amino groups of a polymer compound having the hydroxy groups or amino groups with a compound represented by the following general formula (I) with one or more kinds of compounds represented by the following general formulae (II) to (V): (I) A-X—Si$(Y)_n R_{3-n}$; (II) M$(OR^1)_n R^2_{4-n}$; (III) Al$(OR^1)_p R^2_{3-p}$; (IV) Mg$(OR^1)_q R^2_{2-q}$; and (V) [Si$(OR^3)_n R^4_{3-n}$]—(X)—[Si$(OR^5)_n R^6_{3-n}$].

11 Claims, 7 Drawing Sheets

Derivative A ( $R^1 : R^2 = 97.7 : 2.3$ )
Derivative B ( $R^1 : R^2 = 98.6 : 1.4$ )
Derivative C ( $R^1 : R^2 = 97.3 : 2.7$ )
Derivative D ( $R^1 : R^2 = 98.3 : 1.7$ )
Derivative F ( $R^1 : R^2 = 98.3 : 1.7$ )

Derivative E ($R^1 : R^2 = 98.3 : 1.7$)

SEPARATING AGENT FOR OPTICAL ISOMER

This is a divisional of prior U.S. application Ser. No. 12/450,947, which was the national stage of International Application No. PCT/JP2008/058421, filed May 2, 2008.

TECHNICAL FIELD

The present invention relates to a complex used in a separating agent for optical isomers.

BACKGROUND ART

It has recently become more and more important to obtain large amounts of optical isomers in a short time period with ease in terms of the research and development of drugs and high-performance materials.

Optical resolution by chromatography has conventionally been attracting attention remarkably in various fields including analytical chemistry, organic chemistry, medicine, and pharmacy, and a large number of chiral stationary phases have been reported in the world. In particular, for example, an ester derivative or carbamate derivative obtained by chemically modifying a polysaccharide such as cellulose or amylose as an optically active polymer serves as a chiral stationary phase having a high optical resolution, and a filler for chromatography using such a derivative has been known to the public. A filler for chromatography using such a polymer compound derivative is used in a state of being carried by a carrier such as silica gel for the purposes of, for example, increasing the ratio at which a column is filled with the filler, and improving the ease of handling and mechanical strength of the filler.

For example, Patent Document 1 describes a filler for chromatography obtained by causing a carrier such as silica to carry a cellulose derivative containing an aromatic ring. In addition, Patent Document 2 describes a filler for chromatography obtained by causing a carrier such as silica to carry an alkyl-substituted phenylcarbamate derivative of a polysaccharide in which 80 to 100% of the hydroxy groups thereof are substituted. Further, Patent Document 3 describes a separating adsorbent obtained by causing a carrier formed of porous silica gel to carry an optically active polymer.

However, the above conventional filler for chromatography using a polymer compound such as a polysaccharide derivative has the following constitution: mainly an inorganic carrier is caused to carry the polymer compound derivative on itself by physical adsorption. Such a filler for chromatography involves the following constraint: a solvent that dissolves the polymer compound such as a polysaccharide derivative cannot be used as a mobile phase. In addition, it is difficult to separate large amounts of optical isomers in one stroke with the filler because only the molecules of the polymer compound present at the surface on the inorganic carrier contribute to optical resolution.

In order that the filler may serve as a separating agent for optical isomers suitable for fractionating large amounts of optical isomers in one stroke, for example, attempts have been made to increase the amount of the polymer compound derivative having an ability to separate optical isomers carried by the inorganic carrier, and a separating agent in which such attempts are made has been developed (see, for example, Patent Document 4).

However, the amount of the polymer compound derivative which the inorganic carrier can carry on itself is limited, and there has been room for further development of am optimum separating agent for the separation of large amounts of optical isomers.

Meanwhile, separating agents for optical isomers each not using an inorganic carrier and each formed only of a polymer compound derivative have also been developed (see, for example, Patent Documents 5 and 6). Any such separating agent allows one to separate larger amounts of optical isomers in one stroke than those in the case of the filler as described above because the separating agent is formed only of a portion that contributes to the separation of the optical isomers.

However, any such separating agent for optical isomers has a low mechanical strength, and its use under high pressures at high flow rates is restricted because the separating agent is formed only of an organic compound. In addition, the following problem arises: a solvent used cannot be changed during the analysis of the optical isomers because the organic compound swells and contracts.

Patent Document 1: JP 60-142930 A
Patent Document 2: JP 8-13844 B
Patent Document 3: JP 6-91956 B
Patent Document 4: WO 2002/030853 A1
Patent Document 5: JP 3181349 B
Patent Document 6: WO 2004/086029 A1

DISCLOSURE OF THE INVENTION

Problems to be Solved by the Invention

The present invention provides a complex for use in the production of a separating agent for optical isomers having the following characteristics: a ratio of the molecules of a polymer compound derivative that contribute to the separation of optical isomers in the separating agent for optical isomers is made larger than a conventional one, and the separating agent has a high mechanical strength.

Means for Solving the Problems

The present invention has been made in view of the above circumstances, and the inventors of the present invention have developed a complex that can be used in a separating agent for optical isomers as a result of their extensive studies. The inventors have found that: since the complex includes a structure in which an element such as silicon and a polymer compound derivative are three-dimensionally crosslinked as described later, a solvent to be used is not limited, and the complex can not only be excellent in solvent resistance but also show an increased ratio of the molecules of the polymer compound derivative that contribute to the separation of optical isomers; and, when the complex is used in a separating agent for optical isomers, the separating agent shows an increased mechanical strength.

In the present invention, a complex obtained by the following procedure is used in the separation of optical isomers: a polymer compound derivative obtained by modifying part of the hydroxy or amino groups of a polymer compound having the hydroxy or amino groups and a specific compound to be described later are caused to react with each other. To be additionally specific, the present invention provides a complex obtained by causing a polymer compound derivative obtained by modifying part of the hydroxy or amino groups of the above polymer compound having the hydroxy or amino groups with a compound represented by the following general formula (I) and one or more kinds of compounds represented by the following general formulae (II) to (V) to react with each other:

[Chem 1]

$$A\text{-}X\text{—}Si(Y)_n R_{3-n} \quad (I)$$

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3;

[Chem 2]

$$M(OR^1)_n R^2{}_{4-n} \quad (II)$$

[Chem 3]

$$Al(OR^1)_p R^2{}_{3-p} \quad (III)$$

[Chem 4]

$$Mg(OR^1)_q R^2{}_{2-q} \quad (IV)$$

where M represents silicon (Si), titanium (Ti), zirconium (Zr), or chromium (Cr), Al represents aluminum, Mg represents magnesium, $R^1$ represents hydrogen or an alkyl group having 1 to 12 carbon atoms, $R^2$ represents an alkyl group which has 1 to 18 carbon atoms and which may have a branch or an aryl group which may have a substituent, n represents an integer of 1 to 4, p represents an integer of 1 to 3, and q represents an integer of 1 or 2;

[Chem 5]

$$[Si(OR^3)_n R^4{}_{3-n}]\text{—}(X)\text{—}[Si(OR^5)_n R^6{}_{3-n}] \quad (V)$$

where $R^3$, $R^4$, $R^5$, and $R^6$ each independently represent an alkyl group which has 1 to 18 carbon atoms and which may have a branch or an aryl group which may have a substituent, and X represents an alkylene group which has 1 to 18 carbon atoms and which may have a branch or an arylene group which may have a substituent.

In addition, the present invention provides a complex obtained by the following procedure, the complex being in a bead form: a polymer compound derivative obtained by modifying part of the hydroxy or amino groups of a polymer compound having the hydroxy or amino groups with a compound represented by the above general formula (I) and one or more kinds of compounds represented by the above general formulae (II) to (V) are caused to react with each other.

In addition, the present invention provides a method of producing a complex, the method including the steps of: dissolving a polymer compound derivative obtained by modifying part of the hydroxy or amino groups of a polymer compound having the hydroxy or amino groups with a compound represented by the above general formula (I) and one or more kinds of compounds represented by the above general formulae (II) to (V) in an organic solvent to prepare a solution; and dropping the solution into an aqueous solution of a surfactant or a proton-donating solvent while stirring the aqueous solution or the solvent.

Further, the present invention provides a separating agent for optical isomers, the separating agent containing a complex obtained by the following procedure: a polymer compound derivative obtained by modifying part of the hydroxy or amino groups of a polymer compound having the hydroxy or amino groups with a compound represented by the above general formula (I) and one or more kinds of compounds represented by the above general formulae (II) to (V) are caused to react with each other.

Effect of the Invention

The complex according to the present invention obtained by the following procedure is extremely useful as a high-performance material, and is effectively used particularly in the production of a separating agent for use in the separation of optical isomers: a polymer compound derivative modified with a compound represented by the above general formula (I) and one or more kinds of compounds represented by the above general formulae (II) to (V) are caused to react with each other.

When the complex of the present invention is used in a separating agent for use in the separation of optical isomers, the separating agent can separate large amounts of the optical isomers in one stroke because a ratio of the molecules of the polymer compound derivative that contribute to the separation of the optical isomers in the complex is large.

In addition, when the complex of the present invention is used in a separating agent for use in the separation of optical isomers, the separating agent shows a high mechanical strength because the complex contains a three-dimensionally crosslinked inorganic substance.

In addition, the polymer compound derivative and the three-dimensionally crosslinked inorganic substance are chemically bonded to each other in the complex of the present invention, so even a solvent that may dissolve the polymer compound derivative can be used, and the complex is excellent in solvent resistance.

In addition, when the complex of the present invention is used in a separating agent for use in the separation of optical isomers, the swelling and contraction of the separating agent are suppressed, and the separating agent is suitable not only for the analysis of the optical isomers but also for an application where the optical isomers are separated because the complex contains a compound having a functional group that reacts with an alkoxysilyl group.

BEST MODE FOR CARRYING OUT THE INVENTION

Figure 1:
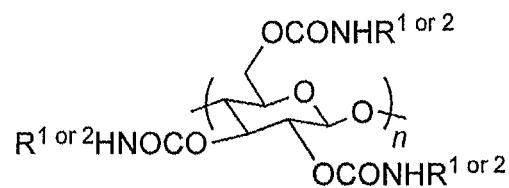
FIG. 1 is a view illustrating the structure of a polymer compound derivative (cellulose derivative) obtained in each of Examples 1 to 3, 5, and 9.
Figure 1:
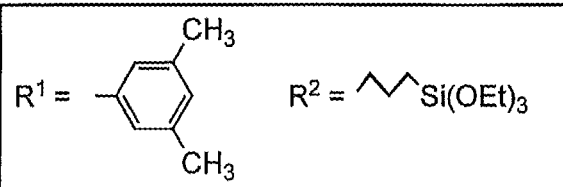

<1> Polymer Compound Derivative for Use in Production of Complex of the Present Invention The polymer compound derivative to be used in the present invention is formed by modifying part of the hydroxy or amino groups of a polymer compound having the hydroxy or amino groups with molecules of a compound represented by the following general formula (I):

[Chem 6]

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3.

The above-mentioned polymer compound to be used in the production of the polymer compound derivative used in the present invention is preferably an optically active organic polymer compound, or more preferably a polysaccharide. Any one of the natural polysaccharides, synthetic polysaccharides, and natural product-denatured polysaccharides can be preferably used as the polysaccharide to be used in the present invention as long as the polysaccharide to be used has chirality. Of those, a polysaccharide in which monosaccharides are regularly bonded to each other is suitable because the polysaccharide can additionally improve the ability of a filler containing the polymer compound derivative to separate optical isomers.

Specific examples of the polysaccharide include β-1,4-glucan (cellulose), α-1,4-glucan (amylose, amylopectin), α-1,6-glucan (dextran), β-1,6-glucan (pustulan), β-1,3-glucan (curdlan, schizophyllan), α-1,3-glucan, β-1,2-glucan (Crown Gall polysaccharide), β-1,4-galactan, β-1,4-mannan, α-1,6-mannan, β-1,2-fructan (inulin), β-2,6-fructan (levan), β-1,4-xylan, β-1,3-xylan, β-1,4-chitosan, β-1,4-N-acetylchitosan (chitin), pullulan, agarose, alginic acid, α-cyclodextrin, β-cyclodextrin, and γ-cyclodextrin. Starch containing amylose is also included.

Of those, preferred are cellulose, amylose, β-1,4-chitosan, chitin, β-1,4-mannan, β-1,4-xylan, inulin, curdlan, and the like, with which high-purity polysaccharides can be easily obtained, and cellulose and amylose are more preferred.

The polysaccharide has a number average degree of polymerization (average number of pyranose or furanose rings in one molecule) of preferably 5 or more, or more preferably 10 or more, and there is no particular upper limit for the number average degree of polymerization; the number average degree of polymerization is preferably 1,000 or less in terms of the ease of handling of the polysaccharide, and is more preferably 5 to 1,000, still more preferably 10 to 1,000, or particularly preferably 10 to 500.

In the present invention, the polymer compound derivative means a polymer compound obtained by modifying part of the hydroxy or amino groups of a polymer compound having the hydroxy or amino groups. When the polymer compound to be used as a raw material for the production of the polymer compound derivative is a polysaccharide, the above-mentioned polymer compound derivative is a polysaccharide derivative.

In the Above General Formula (I):

A represents a reactive group that reacts with a hydroxy or amino group, and the reactive group is preferably, for example, a chlorocarbonyl group, a carboxyl group, an isocyanate group, a glycidyl group, or a thiocyanate group;

X represents an alkylene group which has 1 to 18 carbon atoms and which may have a branch or may have a heteroatom introduced into itself, or an arylene group which may have a substituent, examples of the substituent which the arylene group may have include an alkyl group having 1 to 12 carbon atoms, an alkoxy group having 1 to 12 carbon atoms, an alkylthio group having 1 to 12 carbon atoms, a cyano group, a halogen, an acyl group having 1 to 8 carbon atoms, an acyloxy group having 1 to 8 carbon atoms, a hydroxy group, an alkoxycarbonyl group having 1 to 12 carbon atoms, a nitro group, an amino group, and a dialkylamino group having alkyl groups each having 1 to 8 carbon atoms, specific preferable examples of X include alkylene groups each of which has 1 to 18 carbon atoms and each of which may have a branch, and out of the examples, an ethylene group, a propylene group, a butylene group, or the like is particularly preferable;

Y represents a reactive group that reacts with a silanol group to form a siloxane bond, and the reactive group is preferably, for example, an alkoxy group having 1 to 12 carbon atoms or a halogen, or particularly preferably, for example, a methoxy group, an ethoxy group, or a propoxy group;

R represents an alkyl group which has 1 to 18 carbon atoms and which may have a branch or an aryl group which may have a substituent, and examples of the substituent which the aryl group may have include an alkyl group having 1 to 12 carbon atoms, an alkoxy group having 1 to 12 carbon atoms, an alkylthio group having 1 to 12 carbon atoms, a cyano group, a halogen, an acyl group having 1 to 8 carbon atoms, an acyloxy group having 1 to 8 carbon atoms, a hydroxy group, an alkoxycarbonyl group having 1 to 12 carbon atoms, a nitro group, an amino group, and a dialkylamino group having alkyl groups each having 1 to 8 carbon atoms; and n represents an integer of 1 to 3.

Examples of the compound represented by the above-mentioned general formula (I) include 3-isocyanatopropyltriethoxysilane, 3-isocyanatepropyltrimethoxysilane, 3-isocyanatepropyldiethoxymethylsilane, 2-isocyanateethyltriethoxysilane, 4-isocyanatephenyltriethoxysilane, 3-glycidoxypropyltrimethoxysilane, 3-glycidoxypropyltriethoxysilane, and 3-thiocyanatepropyltriethoxysilane. Preferred are 3-isocyanatepropyltriethoxysilane and 3-isocyanatepropyltrimethoxysilane.

In the above-mentioned polymer compound derivative, molecules of the compound represented by the above-mentioned general formula (I) are introduced into part of the hydroxy or amino groups of the above-mentioned polymer compound having the hydroxy or amino groups.

The positions at which the molecules of the compound represented by the above-mentioned general formula (I) are introduced into the hydroxy or amino groups of the above-mentioned polymer compound having the hydroxy or amino groups are not particularly limited.

In addition, the above-mentioned term "part" can be represented as a ratio of introduction of the molecules of the compound represented by the above-mentioned general formula (I) into the hydroxy or amino groups of the polymer compound having the hydroxy or amino groups. The ratio of introduction is preferably 1.0 to 35%, more preferably 1.5 to 20%, or particularly preferably 2.0 to 10%. The reason why a ratio of introduction of the molecules of the compound represented by the above-mentioned general formula (I) of less than 1.0% or in excess of 35% is not preferable is as follows: when the ratio is less than 1.0%, the yield in which each of the polymer compound derivative and a bead composed of the polymer compound derivative is produced reduces while, when the ratio exceeds 35%, the optical separation ability of a filler containing the polymer compound derivative reduces.

In addition, the above-mentioned ratio of introduction (%) is defined as follows: when the polymer compound to be used in the production of the above-mentioned polymer compound derivative of the present invention has only hydroxy groups, the ratio of introduction is a numerical value obtained by multiplying a ratio of the number of hydroxy groups modified with the molecules of the compound represented by the above-mentioned general formula (I) to the total number of the hydroxy groups of the polymer compound by 100; when the above-mentioned polymer compound has only amino groups, the ratio of introduction is a numerical value obtained by multiplying a ratio of the number of amino groups modified with the molecules of the compound represented by the above-mentioned general formula (I) to the total number of the amino groups by 100; or when the above-mentioned polymer compound has hydroxy groups and amino groups, the ratio of introduction is a numerical value obtained by multiplying a ratio of the sum of the numbers of hydroxy groups and amino groups modified with the molecules of the compound with which the hydroxy or amino groups are modified to the sum of the total number of the hydroxy groups and the total number of the amino groups by 100%. In addition, in the present invention, the same definition as that described above is applicable also to the ratio of introduction of molecules of a compound except the compound represented by the above-mentioned general formula (I).

In the above-mentioned polymer compound derivative, at least part of the hydroxy or amino groups except the hydroxy or amino groups modified with the molecules of the compound represented by the above-mentioned general formula (I) are preferably further modified with molecules of a compound having a functional group which acts on an optical isomer.

The above-mentioned functional group is a functional group, which acts on an optical isomer in a sample containing optical isomers to be separated. The action of the functional group on the optical isomer cannot be uniquely defined because the kind of the functional group varies depending on the kinds of the optical isomers to be separated; the action is not particularly limited as long as the action suffices for the optical resolution of the above-mentioned optical isomers with the above-mentioned polymer compound derivative. Examples of the above-mentioned functional group include a group containing an aromatic group, which may have a substituent, and an aliphatic group having a cyclic structure. The above-mentioned aromatic group can contain a heterocyclic ring or a condensed ring. Examples of the substituent, which the above-mentioned aromatic group may have, include an alkyl group having up to about 8 carbon atoms, a halogen, an amino group, and an alkoxyl group. The above-mentioned functional group is selected in accordance with the kinds of the above-mentioned optical isomers to be separated.

In addition, the molecules of the compound having the functional group which acts on an optical isomer are preferably introduced into the at least part of the hydroxy or amino groups except the hydroxy or amino groups modified with the molecules of the compound represented by the above-mentioned general formula (I) through a urethane bond, an ester bond, or an ether bond for a hydroxy group and a urea bond or an amide bond for an amino group; a urethane bond and a urea bond are particularly preferable for a hydroxy group and an amino group, respectively. Therefore, the above-mentioned compound having the functional group, which acts on an optical isomer, is a compound having a functional group, which can react with a hydroxy or amino group of the above-mentioned polymer compound as well. The above-mentioned compound having a functional group which can react with a hydroxy or amino group may be any compound as long as the compound is an isocyanic acid derivative, a carboxylic acid, an acid halide, an alcohol, or any other compound having reactivity with a hydroxy or amino group.

It should be noted that neither the ratio of introduction of the molecules of the compound having the above-mentioned functional group nor the positions at which the molecules of the compound are introduced in the polymer compound is particularly limited, and the ratio and the positions are appropriately selected in accordance with, for example, the kind of the functional group and the kind of the polymer compound.

The above-mentioned compound having a functional group which acts on an optical isomer is particularly preferably a compound containing an atomic group represented by the following general formula (VI) or (VII):

[Chem 7]

—CO—R'              (VI)

—CO—NH—R'        (VII)

where R' represents an aliphatic or aromatic hydrocarbon group which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, a cyano group, a halogen, a hydroxy group, a nitro group, an amino group, and a dialkylamino group containing two alkyl groups each having 1 to 8 carbon atoms.

Examples of the monovalent aromatic hydrocarbon group represented by R' described above include a phenyl, naphthyl, phenanthryl, anthracyl, indenyl, indanyl, furyl, thionyl, pyryl, benzofuryl, benzthionyl, indyl, pyridyl, pyrimidyl, quinolinyl, and isoquinolinyl group. In addition, examples of the substituent for the monovalent aromatic hydrocarbon group represented by R' include alkyl groups each having 1 to 12 carbon atoms, alkoxy groups each having 1 to 12 carbon atoms, alkylthio groups each having 1 to 12 carbon atoms, a cyano group, halogens, acyl groups each having 1 to 8 carbon atoms, acyloxy groups each having 1 to 8 carbon atoms, a hydroxy group, alkoxycarbonyl groups each having 1 to 12 carbon atoms, a nitro group, amino groups, and a dialkylamino group containing two alkyl groups each having 1 to 8 carbon atoms. In addition, as the aliphatic hydrocarbon group represented by R' described above, desired is an alicyclic compound containing more than 3 rings, or more preferably more than 5 rings, or an alicyclic compound having a cross linked structure. Of those, preferred is a cyclohexyl, cyclopentyl, norbornyl, cycloadamantyl pentyl group, or the like.

In the present invention, part of the hydroxy or amino groups except the hydroxy or amino groups modified with the molecules of the compound represented by the above-mentioned general formula (I) is preferably modified with molecules of one or more kinds of compounds selected from the group consisting of phenyl isocyanate, tolyl isocyanate, naphthylethylisocyanate, 3,5-dimethylphenyl isocyanate, 3,5-dichlorophenyl isocyanate, 4-chlorophenyl isocyanate, 3,5-dinitrophenyl isocyanate, 1-phenylethylisocyanate, benzoic acid or benzoic acid halide, and 4-methylphenyl carboxylic acid (halide). Those groups are particularly preferably modified with molecules of 3,5-dimethylphenyl isocyanate.

In the polymer compound derivative of the present invention, the sum of the ratio of introduction of the molecules of the compound represented by the above-mentioned general formula (I) and the ratio of introduction of the molecules of the compound having the above-mentioned functional group is preferably 90 to 100%, more preferably 97 to 100%, or particularly preferably 100%.

<2> Method of Producing Polymer Compound Derivative of the Present Invention

The polymer compound derivative used for producing the complex of the present invention can be produced as described below. That is, a first method of producing the polymer compound derivative of the present invention includes at least:

a first modifying step of modifying part of the hydroxy or amino groups of a polymer compound having the hydroxy or amino groups, the polymer compound being dissolved, with molecules of a compound except a compound represented by the above-mentioned general formula (I); and a second modifying step of modifying hydroxy or amino groups of the above-mentioned polymer compound which are not modified with the molecules of the compound except the compound represented by the above-mentioned general formula (I) in the above-mentioned first modifying step with molecules of the compound represented by the above-mentioned general formula (I).

The above-mentioned first modifying step is preferably performed before the above-mentioned second modifying step in order that the compound represented by the above-mentioned general formula (I) may be efficiently and controllably introduced into the above-mentioned polymer compound.

It should be noted that the above-mentioned production method may further include a step of dissolving the polymer compound in order that a dissolved polymer compound having hydroxy or amino groups may be obtained. In the above-mentioned dissolving step, a known method can be employed for dissolving the polymer compound; when the polymer compound to be dissolved is hardly soluble in a solvent or the like, the method preferably includes a step of swelling the polymer compound. In addition, when a dissolved polymer compound having hydroxy or amino groups is commercially available, the dissolved polymer compound may be purchased and used.

As a solvent which swells the polymer compound (such as polysaccharide) in the above-mentioned swelling step, an amide-based solvent is preferably used. Examples of the solvent include a mixed solution such as a mixed solution of N,N-dimethyl aceteamide and lithium chloride, N-methyl-2-pyrrolidone and lithium chloride, or 1,3-dimethyl-2-imidazolidinone and lithium chloride. A mixture solution of N,N-dimethyl aceteamide and lithium chloride is particularly preferably used.

The above-mentioned dissolving step is preferably performed under a nitrogen atmosphere. In addition, when the above-mentioned polymer compound is a polysaccharide, the polysaccharide is dissolved under, for example, conditions including a temperature of 20 to 100° C. and a time period of 1 to 24 hours; one skilled in the art can appropriately adjust the conditions depending on the polymer compound to be used.

The above-mentioned first modifying step is a step of modifying part of the hydroxy or amino groups of the polymer compound having the hydroxy or amino groups, the polymer compound being dissolved, with molecules of a compound having at least a functional group which acts on an optical isomer and a functional group which can react with a hydroxy or amino group. A known method can be employed in the modification. The hydroxy or amino groups of the polymer compound are particularly preferably modified with the molecules of the compound having a functional group which acts on an optical isomer in an amount corresponding to 60 to 100 mol % of the hydroxy or amino groups of the polymer compound in a mixed solution of dimethylacetamide, lithium chloride, and pyridine at 80 to 100° C. for 1 to 24 hours under a nitrogen atmosphere in order that the ratio of introduction of the molecules of the compound having the functional group may be controlled. In particular, the reaction temperature, the reaction time, and the additive amount of the compound having a functional group which acts on an optical isomer, each plays an important role in adjusting the ratio of introduction of the molecules of the compound having the above-mentioned functional group.

It should be noted that the positions at which the molecules of the compound having at least a functional group which acts on an optical isomer and a functional group which can react with a hydroxy or amino group are introduced in the polymer compound derivative in the present invention are not particularly limited.

The above-mentioned second modifying step is a step of modifying the hydroxy or amino groups of the polymer compound the hydroxy or amino groups of which are not completely modified with the molecules of the compound having at least a functional group which acts on an optical isomer and a functional group which can react with a hydroxy or amino group in the above-mentioned first modifying step with the molecules of the compound represented by the above-mentioned general formula (I). A known method can be employed in the modification. The hydroxy or amino groups before modification of the polymer compound are particularly preferably modified with the molecules of the compound represented by the above-mentioned general formula (I) in an amount corresponding to 1 to 10 mol % of the hydroxy or amino groups before modification of the polymer compound in a mixed solvent of dimethylacetamide, lithium chloride, and pyridine at 80 to 100° C. for 1 to 24 hours under a nitrogen atmosphere in order that the ratio of introduction of the molecules of the compound represented by the above-mentioned general formula (I) may be controlled. Of those conditions, the additive amount of the compound represented by the above-mentioned general formula (I) plays a particularly important role in controlling the ratio of introduction of the molecules of the compound represented by the above-mentioned general formula (I).

It should be noted that the positions at which the molecules of the compound represented by the above-mentioned general formula (I) are introduced in the polymer compound derivative in the present invention are not particularly limited. When unreacted hydroxy or amino groups are present at the time of the completion of the above-mentioned second modifying step, they are caused to react with the molecules of the compound having the functional groups used in the first modifying step.

In addition, a method of producing the polymer compound derivative to be used in the present invention may be a method including at least: a protective group-introducing step of introducing a protective group into each of part of the hydroxy or amino groups of the polymer compound having the hydroxy or amino groups, the polymer compound being dissolved; a first modifying step of modifying the hydroxy or amino groups remaining in the polymer compound into which the protective group has been introduced with molecules of a compound except the compound represented by the above-mentioned general formula (I); an eliminating step of eliminating the introduced protective group to regenerate hydroxy groups; and a second modifying step of modifying the regenerated hydroxy groups or the amino groups with the molecules of the compound represented by the above-mentioned general formula (I). In the above-mentioned production method including the protective group-introducing step and the eliminating step, the hydroxy or amino groups at specific positions of the polymer compound can be modified with the molecules of the compound represented by the above-mentioned general formula (I).

In the above-mentioned production method including the protective group-introducing step and the eliminating step, the protective group to be introduced in the protective group-introducing step is not particularly limited as long as the group can be eliminated from a hydroxy or amino group more easily than a compound with which a hydroxy or amino group is modified in each modifying step is. A compound for introducing the protective group can be determined on the basis of the reactivity of a hydroxy or amino group to be protected or modified and the reactivity of the compound with a hydroxy or amino group. The compound is, for example, a compound having a triphenylmethyl group (trityl group), a diphenylmethyl group, a tosyl group, a mesyl group, a trimethylsilyl group, or a dimethyl (t-butyl) silyl group, and a compound having a trityl group or a trimethylsilyl group is suitably used.

The introduction of the protective group into a hydroxy or amino group, and the modification of a hydroxy or amino group with a modifying compound can each be performed by a known proper reaction in accordance with the kind of a compound to be caused to react with a hydroxy or amino group. In addition, the elimination of the protective group from a hydroxy or amino group in the eliminating step can be performed by a known method such as hydrolysis with an acid or alkali without any particular limitation.

According to the above-mentioned first production method, there is no need to take the trouble to introduce a protective group, so the number of steps can be reduced. As a result, a reduction in cost for the production of the polymer compound derivative can be achieved. In addition, according to the above-mentioned second production step, a molecule of the compound represented by the above-mentioned general formula (I) can be introduced into a hydroxy group at a predetermined position of the polymer compound with reliability.

It should be noted that the employment of the above-mentioned first production method of the present invention allows a predetermined amount of the hydroxy or amino groups of the polymer compound derivative not modified with the molecules of the compound except the compound represented by the above-mentioned general formula (I) in the first modifying step to be modified with the molecules of the compound represented by the above-mentioned general formula (I) in the second modifying step. Therefore, the ratio of introduction of the molecules of the compound represented by the above-mentioned formula (I) into the polymer compound having hydroxy or amino groups can be controlled by adjusting the amount of the compound represented by the above-mentioned general formula (I) in the second modifying step.

When the ratio of introduction of the molecules of the compound represented by the above-mentioned general formula (I) in the polymer compound derivative of the present invention is determined, each of the following two methods, each involving the use of $^1$H NMR, is preferably employed. When a reaction between the compound represented by the above-mentioned general formula (I) and a hydroxy or amino group is complete, the ratios of introduction of the molecules of the compound represented by the above-mentioned general formula (I) determined by the respective methods show an identical value. In the present invention, the following method (2) was employed.

(1) The ratio of introduction of the molecules of a compound except the compound represented by the above-mentioned general formula (I) in the polymer compound derivative is determined from a result of elemental analysis for the polymer compound derivative before the introduction of the compound represented by the above-mentioned general formula (I). After that, the ratio of introduction of silyl groups in the polymer compound derivative into which the compound represented by the above-mentioned general formula (I) has been introduced is calculated from a ratio of the polymer compound derivative between a proton of a functional group of the compound except the compound represented by the above-mentioned general formula (I) and a proton of a functional group directly bonded to silicon of the compound represented by the above-mentioned general formula (I), and the calculated value is defined as the ratio of introduction of the molecules of the compound represented by the above-mentioned general formula (I) in the polymer compound derivative.

(2) After the completion of the modifying steps, a ratio between a proton of a functional group of the compound except the compound represented by the above-mentioned general formula (I) and a proton of a functional group directly bonded to silicon of the compound represented by the above-mentioned general formula (I) is determined on the assumption that the hydroxy or amino groups of the polymer compound derivative of the present invention are completely modified with modifying groups. Then, the ratio of introduction of the molecules of the compound represented by the above-mentioned general formula (I) in the polymer compound derivative is calculated.

<3>

(1) Compounds Represented by General Formulae (II) to (IV)

Compounds represented by the following general formulae (II) to (IV) used in the present invention are not particularly limited as long as each of the compounds can react with the group Y of the compound represented by the above general formula (I), and can be used in the production of the complex of the present invention:

[Chem 8]

$$M(OR^1)_n R^2_{4-n} \quad (II)$$

[Chem 9]

$$Al(OR^1)_p R^2_{3-p} \quad (III)$$

[Chem 10]

$$Mg(OR^1)_q R^2_{2-q} \quad (IV)$$

where M represents silicon (Si), titanium (Ti), zirconium (Zr), or chromium (Cr), Al represents aluminum, Mg represents magnesium, $R^1$ represents hydrogen or an alkyl group having 1 to 12 carbon atoms, $R^2$ represents an alkyl group which has 1 to 18 carbon atoms and which may have a branch or an aryl group which may have a substituent, n represents an integer of 1 to 4, p represents an integer of 1 to 3, and q represents an integer of 1 or 2.

One kind of the compounds represented by the above general formulae (II) to (IV) may be used alone, or two or more kinds of them may be used in combination; one or more kinds of compounds represented by the above general formula (II) are preferably used.

In the above general formula (II), M preferably represents silicon (Si), $R^1$ preferably represents an alkyl group having 1 to 6 carbon atoms, examples of the substituent which the aryl group represented by $R^2$ may have include an alkyl group having 1 to 12 carbon atoms, an alkoxy group having 1 to 12 carbon atoms, an alkylthio group having 1 to 12 carbon atoms, a cyano group, a halogen, an acyl group having 1 to 8 carbon atoms, an acyloxy group having 1 to 8 carbon atoms, a hydroxy group, an alkoxycarbonyl group having 1 to 12 carbon atoms, a nitro group, an amino group, and a dialkylamino group having alkyl groups each having 1 to 8 carbon atoms, $R^2$ preferably represents a methyl group or a phenyl group, and n preferably represents 3 or 4.

Specific examples of the compound represented in the above general formula (II) include tetraethoxysilane, tetramethoxysilane, tetra-n-propoxysilane, tetraisopropoxysilane, tetra-n-butoxysilane, tetraisobutoxysilane, tetra-sec-butoxysilane, tetra-t-butoxysilane, tetrapentyloxysilane, tetrahexyloxysilane, triethoxymethylsilane, and triethoxyphenylsilane. Of those, tetraethoxysilane is particularly preferable.

The amount of the compounds represented by the above general formulae (II) to (IV) used at the time of the production of the complex of the present invention can be appropriately adjusted so that the content of organic substances in the complex may be a suitable one as described later.

(2) Compounds Represented by General Formula (V)

Compounds represented by the following general formula (V) used in the present invention are not particularly limited as long as each of the compounds can react with the group Y of the compound represented by the above general formula (I), and can be used in the production of the complex of the present invention:

[Chem 11]

$$[Si(OR^3)_n R^4_{3-n}] - (X) - [Si(OR^5)_n R^6_{3-n}] \quad (V)$$

where $R^3$, $R^4$, $R^5$, and $R^6$ each independently represent an alkyl group which has 1 to 18 carbon atoms and which may have a branch or an aryl group which may have a substituent, and X represents an alkylene group which has 1 to 18 carbon atoms and which may have a branch or an arylene group which may have a substituent.

Examples of the substituents which the above aryl group represented by any one of $R^3$, $R^4$, $R^5$, and $R^6$, and the above alkylene or arylene group represented by X may have include an alkyl group having 1 to 12 carbon atoms, an alkoxy group having 1 to 12 carbon atoms, an alkylthio group having 1 to 12 carbon atoms, a cyano group, a halogen, an acyl group having 1 to 8 carbon atoms, an acyloxy group having 1 to 8 carbon atoms, a hydroxy group, an alkoxycarbonyl group having 1 to 12 carbon atoms, a nitro group, an amino group, and a dialkylamino group having alkyl groups each having 1 to 8 carbon atoms.

Specific examples of the compound represented by the above general formula (V) include bis(trimethoxysilyl) methane, bis(triethoxysilyl) methane, 1,1-bis(trimethoxysilyl) ethane, 1,1-bis(triethoxysilyl) ethane, 1,2-bis(trimethoxysilyl) ethane, 1,3-bis(trimethoxysilyl) propane, 1,3-bis(triethoxysilyl) propane, 2,2-bis(trimethoxysilyl) propane, 2,2-bis(triethoxysilyl) propane, 1,4-bis(trimethoxysilyl)benzene, 1,4-bis(triethoxysilyl)benzene, and 1,2-bistriethoxysilylethane. Of which, 1,2-bistriethoxysilylethane is particularly preferable.

One kind of the compounds represented by the above general formula (V) may be used alone, or two or more kinds of them may be used in combination.

The amount of the compounds represented by the above general formula (V) used at the time of the production of the complex of the present invention can be appropriately adjusted so that the content of the organic substances in the complex may be a suitable one as described later.

In the production of the complex of the present invention to be described later, one kind of the compounds represented by any one of the above general formulae (II) to (V) may be used alone, or two or more kinds of them may be used in combination. A particularly preferable combination is, for example, as follows: one or more kinds of the compounds represented by the above general formulae (II) to (IV) and one or more kinds of the compounds represented by the above general formula (V) are combined with each other. When one or more kinds of the compounds represented by the above general formulae (II) to (IV) and one or more kinds of the compounds represented by the above general formula (V) are used in combination in the production of the complex of the present invention, the one or more kinds of the compounds represented by the above general formulae (II) to (IV) and the one or more kinds of the compounds represented by the above general formula (V) are combined at a molar ratio "former:latter" of preferably 0.1 to 10:1, or particularly preferably 0.2 to 5:1.

The total amount of the one or more kinds of the compounds represented by the above general formulae (II) to (IV) and the one or more kinds of the compounds represented by the above general formula (V) when these compounds are used in combination can be appropriately adjusted so that the content of the organic substances in the complex may be a suitable one as described later.

<4> Complex of the Present Invention

The complex of the present invention is obtained by causing the above polymer compound derivative and one or more kinds of compounds represented by the above general formulae (II) to (V) to react with each other. The content of the above polymer compound derivative in the complex of the present invention is preferably 10 to 90 wt %, more preferably 20 to 80 wt %, or particularly preferably 30 to 70 wt % with respect to the total amount of the complex from the viewpoint of an ability to separate optical isomers.

Here, as described below, the content of the above polymer compound derivative in the complex of the present invention can be estimated by using a value for the content of the organic substances of the complex determined from the following weight: a weight reduction when the complex is heated to 800° C. by thermogravimetric analysis is considered to be the weight of the organic substances. To be specific, the content (wt %) of the polymer compound derivative in the complex of the present invention can be determined by using the following equation. It should be noted that, when the compound represented by the above general formula (II) is used alone, the content of the polymer compound derivative in the complex of the present invention is calculated in consideration of the content (wt %) of an organic substance derived from the compound represented by the above general formula (II) used in the present invention as represented by the following equation (see Example 4 below).

Content (wt %) of polymer compound derivative=A−B(100−A)/(100−B)  [Eq. 1]

"A" described above represents the content (wt %) of the organic substances in the complex, and "B" described above represents the content (wt %) of the organic substance derived from the compound represented by the above general formula (II) used in the production of the complex.

In addition, when the compound represented by the above general formula (V) is used alone, the content of the polymer compound derivative in the complex of the present invention is calculated in consideration of the content (wt %) of an organic substance derived from the compound represented by the above general formula (V) calculated by employing the same method as that described in Example 4 below as represented by the following equation.

Content (wt %) of polymer compound derivative=A−C(100−A)/(100−C)  [Eq. 2]

"A" described above represents the content (wt o) of the organic substances in the complex, and "C" described above represents the content (wt %) of the organic substance derived from the compound represented by the above general formula (V) used in the production of the complex.

In addition, for example, when one kind of the compounds represented by the above general formula (II) and one kind of the compounds represented by the above general formula (V) are used in combination, the content of the polymer compound derivative in the complex of the present invention is calculated in consideration of the content (wt %) of an organic substance derived from each of the compound represented by the above general formula (II) and the compound represented by the above general formula (V) described above as represented by the following equation.

Content (wt %) of polymer compound derivative=A−{B [a/(a+b)]C[b/(a+b)]}(100−A)/[100−{B[a/(a+b)]+C[b/(a+b)}]  [Eq. 3]

"A" described above represents the content (wt %) of the organic substances in the complex, "B" described above represents the content (wt %) of the organic substance derived from the compound represented by the above general formula (II) used in the production of the complex, "C" described above represents the content (wt %) of the organic substance derived from the compound represented by the above general formula (V) used in the production of the complex, and "a" and "b" represent the molar ratios of the compound represented by the above general formula (II) and the compound represented by the above general formula (V) mixed at the time of the production of the complex, respectively.

It should be noted that, even when two or more kinds of the compounds represented by the above general formulae (II) to (IV) and two or more kinds of the compounds represented by the above general formula (V) are used, the content of the organic substances in the complex can be calculated by the same calculation method as that described above with the contents of the organic substances derived from the respective compounds similarly calculated and the molar ratios of the respective compounds.

The complex of the present invention may be in, for example, a pulverized form; to be specific, as described later, the complex is preferably turned into beads. When the complex of the present invention is in a bead form, the beads can be used as they are in a separating agent for optical isomers. The term "complex" as used in the present invention refers to a complex obtained by causing the above polymer compound derivative and one or more kinds of the compounds represented by the above general formulae (II) to (V) to react with each other as described above. At the time of the formation of the complex, the group Y introduced into the above polymer compound derivative and the one or more kinds of the compounds represented by the above general formulae (II) to (V) react with each other. As a result of the reaction, part of the molecules of the one or more kinds of the compounds represented by the above general formulae (II) to (V) and part of the molecules of the above polymer compound derivative are bonded to each other, and furthermore, the molecules of the one or more kinds of the compounds represented by the above general formulae (II) to (V) are bonded to each other. Thus, a repeating unit of an M-O bond (where M represents any one of the same elements as those appearing in the description of the above general formula (II) and O represents oxygen), a repeating unit of an Al—O bond, a repeating unit of an Mg—O bond, and/or Si—X—Si—O (where X represents any one of the same groups as those appearing in the description of the above general formula (V)) are/is formed in the complex, so the complex may have a structure in which the polymer compound derivative and any such repeating unit are three-dimensionally crosslinked.

The complex of the present invention canbe producedby, for example, mixing the above polymer compound derivative and one or more kinds of the compounds represented by the above general formulae (II) to (V) with an acid in advance to crosslink them partially and dropping the resultant into an aqueous solution of a surfactant.

It should be noted that an anionic surfactant or a cationic surfactant can be used as the above surfactant in the invention of the subject application. When the anionic surfactant out of those surfactants is used, the surfactant is added to water so that the concentration of the surfactant in the above aqueous solution of the surfactant may be preferably 0.02 to 2 wt %, or particularly preferably 0.04 to 1 wt %; similarly, when the cationic surfactant is used, the surfactant is added to water so that the concentration may be preferably 0.02 to 2 wt %, or particularly preferably 0.04 to 1 wt %.

Examples of the anionic surfactants may include sodium dodecylbenzenesulfonate, sodium alkyl naphthalene sulfonate, sodium aryl-alkyl-polyethersulfonate, sodium 3,3-disulfonediphenylurea-4,4-diazo-bis-amino-8-naphthol-6-sulfon ate, ortho-carboxybenzene-azo-dimethylaniline, sodium 2,2,5,5-tetramethyl-triphenylmethane-4,4-diazo-bis-β-naphthol-6-s ulfonate, sodium dialkylsulfosuccinate, sodium dodecylsulfate, sodium tetradecylsulfate, sodium pentadecylsulfate, sodium octylsulfate, sodium oleate, sodiumdodecanate, sodium caprate, sodium caprylate, sodium caproate, potassium stearate, and calcium oleate. Of those, sodium dodecylsulfate is preferably used.

Examples of the cationic surfactants may include alkylbenzenedimethyl ammonium chloride, alkyltrimethyl ammonium chloride, and distearyl ammonium chloride. Of those, alkyltrimethyl ammonium chloride having an alkyl group with 12 to 18 carbon atoms is preferably used.

<5> Beads of the Present Invention

The present invention provides beads as one specific form of the complex obtained by causing the above polymer compound derivative and one or more kinds of the compounds represented by the above general formulae (II) to (V) to react with each other. The beads in the present invention are nearly spherical particles or spherical particles, and their shapes have the following characteristic: when the longest diameter and shortest diameter of each of, for example, about twenty particles are measured, the average longest diameter-to-shortest diameter ratio of the particles is 1.0 to 5.0, preferably 1.0 to 2.0, or more preferably 1.0 to 1.3. In the present invention, the particle shapes and particle sizes of the beads can be determined from an image photographed with, for example, a scanning electron microscope (SEM).

It should be noted that hereinafter, the beads obtained in the invention of the subject application are also referred to as "hybrid beads".

The above-mentioned beads according to the present invention are obtained by a method involving: gradually adding a polymer compound derivative such as a polysaccharide derivative modified with the compound represented by the above-mentioned general formula (I), the polymer compound derivative being dissolved in an organic solvent, to an aqueous solution of a surfactant or a solvent containing a proton-donating solvent such as methanol, the aqueous solution or the solvent being sufficiently stirred, to prompt a cros slinking reaction between the molecules of the polymer compound derivative with at least one of the compounds represented by the above-mentioned general formulae (II) to (V); and isolating an insoluble portion. The organic solvent to be used here may be any solvent as long as the polymer compound derivative such as a polysaccharide derivative and at least one of the compounds represented by the above-mentioned general formulae (II) to (V) are soluble therein; the solvent is particularly preferably hydrophobic. Alternatively, even when the solvent is hydrophilic, the solvent can be used by mixing with a hydrophobic solvent before use.

In a preferred embodiment, for example, such organic solvents include 1-heptanol as a hydrophobic solvent and tetrahydrofuran as a hydrophilic solvent. When the above organic solvents include tetrahydrofuran and 1-heptanol, a volume ratio "tetrahydrofuran:1-heptanol" is preferably 0.1 to 10:1 from the viewpoint of the adjustment of the shapes and organic substance content of the beads of the present invention; the volume ratio "tetrahydrofuran:1-heptanol" is particularly preferably 4:1.

Further, examples of proton-donating solvents include ethanol, 1-propanol, 2-propanol, 1-butyl alcohol, 2-butyl alcohol, isobutyl alcohol, tert-butyl alcohol, cyclohexanol, and methanol.

In addition, from the viewpoints of improvements in solvent resistance and mechanical strength of each of the beads, and the maintenance of the ability of the beads to separate optical isomers, the following operation may be further performed in addition to the above operations: silanol groups remaining on the resultant beads are subjected to end capping with a proper solvent and a silane coupling agent after an operation in which the beads are dried and dispersed in a proper solvent so that a crosslinking reaction in the beads may be performed has been performed or without the performance of such crosslinking reaction.

The beads in the present invention each have a particle size of typically 1 to 500 μm, preferably 5 to 300 μm, or particularly preferably 5 to 100 μm. As long as the particle size falls within such range, the ratio at which a column or the like is filled with the beads (filling rate) can be increased, and hence the ability of the resultant product to separate optical isomers can be improved. In addition, the beads in the present application may be either porous or nonporous, but are preferably porous and have an average pore size of 10 to 10,000 Å, or preferably 50 to 5,000 Å. An average pore size within such range is preferable because a solution containing optical isomers sufficiently permeates into the pores, and the ability of the beads to separate the optical isomers can be improved.

The particle sizes of the beads obtained by the above-mentioned method can be adjusted by adopting the following procedure in the above-mentioned method: adjusting a ratio between the amounts of the organic solvent and the aqueous solution of the surfactant or the solvent containing the proton-donating solvent, adjusting the concentration of the polymer compound derivative such as a polysaccharide derivative, adjusting the speed at which the organic solvent is added to the aqueous solution of the surfactant or the solvent containing the proton-donating solvent, and considering the capacity and shape of a stirring container and the shape of a stirring blade, appropriately changing the speed at which the aqueous solution of the surfactant or the solvent containing the proton-donating solvent is stirred within the range of 800 to 3,000 rpm.

The beads of the present invention can be used as a filler for optical isomer separation not only for HPLC but also for chromatography where high pressure resistance is needed such as supercritical fluid chromatography. When the complex of the present invention is used in a bead form, as described above, a crosslinking reaction occurs at the time of the formation of the beads, and a three-dimensionally crosslinked structure may be present in each of the beads. As a result, the mechanical strength of each of the beads is improved. In addition, an optical isomer separating column filled with the beads as a separating agent for optical isomers by a known method can optically resolve increased amounts of optical isomers in one stroke because the content of the above polymer compound derivative in the beads is larger than a conventional one as described above. As a result, the optical isomer separating column has an excellent ability to separate optical isomers.

In addition, as described above, the crosslinking reaction between the beads occurs simultaneously with the formation of the beads, so there is no need to prompt the crosslinking reaction after the formation of the beads, and a time period for production steps for the filler for optical isomer separation is significantly shortened. As described above, in case of necessity, the solvent resistance and mechanical strength of each of the beads can be additionally improved by properly treating the beads after the preparation of the beads to promote a crosslinking reaction between unreacted Y's in the compound represented by the above-mentioned general formula (I) introduced into the polymer compound derivative.

<6> Separating Agent for Optical Isomers Formed of Complex of the Present Invention The complex of the present invention is preferably produced in a bead form through the above operations, and the beads can be used as a separating agent for optical isomers. When the above beads are used as a separating agent for optical isomers in HPLC or supercritical fluid chromatography, the beads can be used after a column has been filled with the beads by a known method (such as a slurry method).

In addition to the above-mentioned HPLC and supercritical fluid chromatography, the separating agent for optical isomers using the complex formed as beads of the present invention can be used also as a filler for a capillary column for gas chromatography or electrophoresis, or particularly capillary electrochromatography (CEC), capillary zone electrophoresis (CZE), or micellar electrokinetic chromatography (MEKC).

Hereinafter, examples embodying the present invention are described, but the present invention is not limited to those examples.

EXAMPLES

Example 1

(1-1) Synthesis of Cellulose 3,5-dimethylphenylcarbamate Having alkoxysilyl Groups First, 4.00 g (24.7 mmol) of dried cellulose were dissolved in a mixed solution of 120 ml of dehydrated N,N-dimethylacetamide, 60 ml of dehydrated pyridine, and 8.00 g of lithium chloride.

Then, 9.08 g (61.8 mmol) of 3,5-dimethylphenyl isocyanate were added to the resultant solution, and the mixture was subjected to a reaction at 80° C. for 15 hours. After that, 0.52 g (2.1 mmol) of 3-isocyanatepropyltriethoxysilane was added to the resultant, and the mixture was subjected to a reaction at 80° C. for 12 hours. Further, 9.08 g (61.8 mmol) of 3,5-dimethylphenyl isocyanate were added to the resultant, and the mixture was subjected to a reaction at 80° C. for 11 hours. A pyridine soluble portion was dropped into methanol and recovered as an insoluble portion. After that, the portion was dried in a vacuum. As a result, 13.13 g of a cellulose 3,5-dimethylphenylcarbamate derivative A into which alkoxysilyl groups had been introduced were obtained. The following analysis confirmed that the introduction ratios of 3,5-dimethylphenyl isocyanate and the alkoxysilyl groups were 97.7% and 2.3%, respectively (see FIG. 6).

Figure 6:
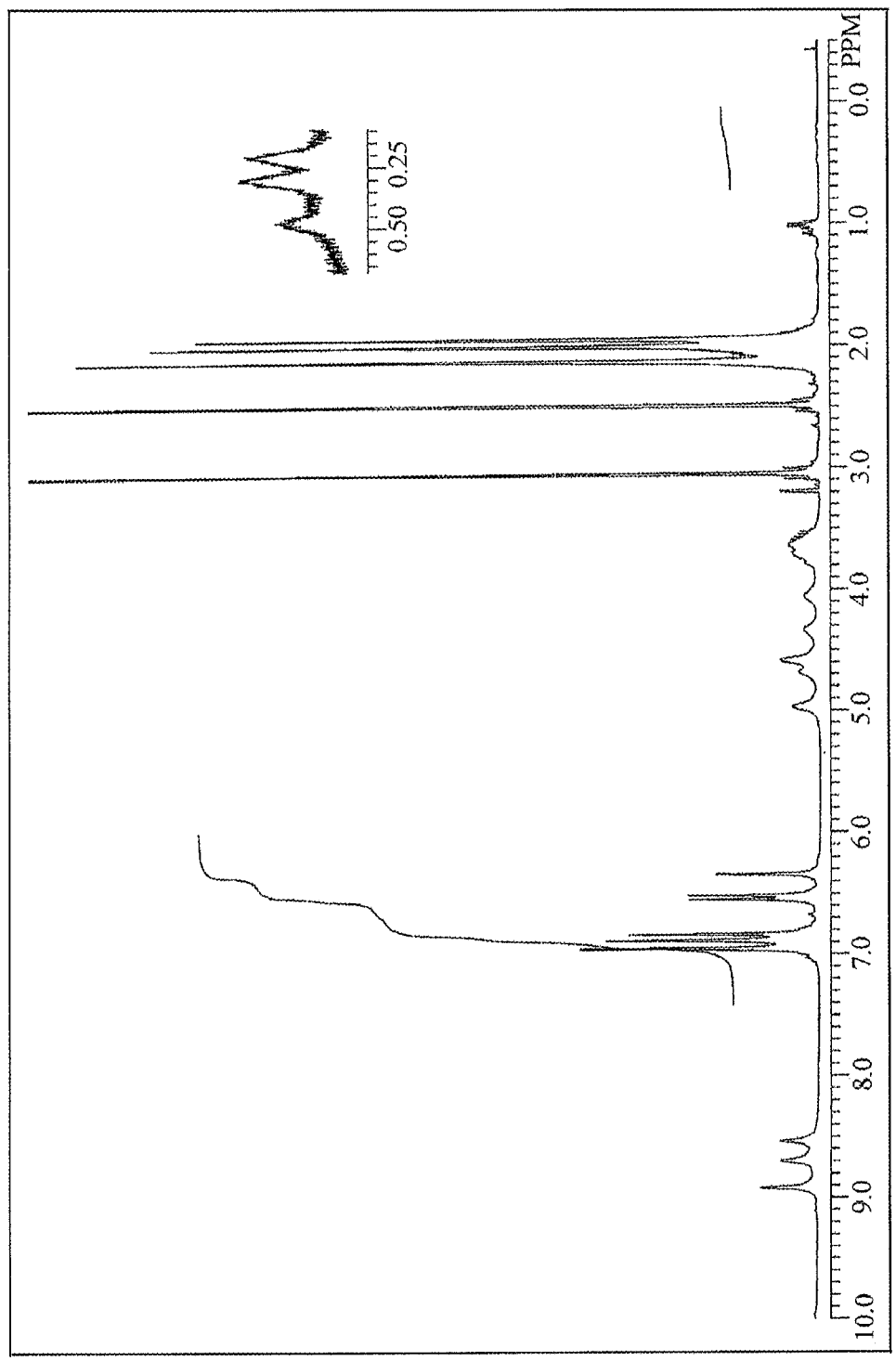
FIG. 6 is a view illustrating the $^1$H NMR spectrum of a cellulose 3,5-dimethylphenylcarbamate containing alkoxysilyl groups (derivative-A) at 80° C. in DMSO-$d_6$ obtained in Example 1.

(1-2) Measurement of Ratio of Introduction of Molecules of 3-Isocyanatepropyltriethoxysilane in Cellulose Derivative The ratio of introduction of silyl groups in the polymer compound derivative was calculated from a ratio between a proton of the phenyl group of a 3,5-dimethylphenyl group of the cellulose derivative into which the silyl groups had been introduced and a methylene proton directly bonded to silicon of a 3-triethoxysilylpropyl group determined from a $^1$H NMR spectrum (400 MHz, Gemini-2000 (manufactured by Varian, Inc.), in DMSO-$d_6$, 80° C.), and was defined as the ratio of introduction of molecules of 3-isocyanatepropyltriethoxysilane in the polymer compound derivative. FIG. 6 shows the $^1$H NMR spectrum of the derivative-A. The $^1$H NMR spectrum shows that a signal derived from the proton of the phenyl group appears at around 6.0 to 7.0 ppm and that a signal derived from the methylene proton bonded to a silyl group appears at around 0.5 ppm. Therefore, the $^1$H NMR results confirmed that the ratio of introduction of the molecules of 3,5-dimethylphenyl isocyanate and the ratio of introduction of the molecules of 3-isocyanatepropyltriethoxysilane were 97.7% and 2.3%, respectively.

(1-3) Preparation of Cellulose Derivative Beads

First, 250 mg of the derivative A, 4 ml of tetraethoxysilane (TEOS), 1 ml of water, and 0.5 ml of chlorotrimethylsilane were dissolved in 30 ml of a mixed solvent containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was passed through a 20-μm filter so that beads each having a large particle diameter might be removed. The suspension after having been passed through the filter was subjected to suction filtration so that hybrid beads might be recovered. Then, the hybrid beads were washed with water and methanol. After the washing, the washed beads were dried in a vacuum. As a result, 368 mg of hybrid beads were obtained. As a result of the repetition of the foregoing operations, hybrid beads-A-1 each having a particle diameter of about 10 μm were recovered. The thermogravimetric analysis (SSC-5200, Seiko Instruments Inc.) of the resultant hybrid beads-A-1 confirmed that an organic substance ratio was 45 wt %. A six-blade type disperser shaft and a one-liter beaker were used in the preparation of the beads.

Figure 2:
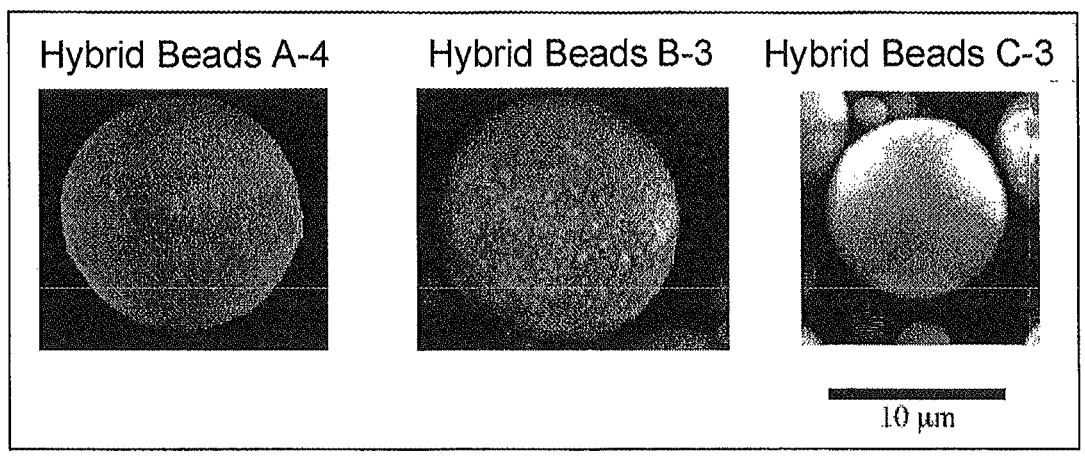
FIG. 2 shows secondary electron images (photographs) of beads obtained in examples photographed with a scanning electron microscope.

Then, 2.1 g of the dried hybrid beads A-1 were dispersed in a mixture "ethanol/water/chlorotrimethylsilane (21 ml/5.25 ml/0.35 ml)", and the dispersion liquid was subjected to a reaction for 1 hour while being refluxed in an oil bath at 100° C. Thus, crosslinking in the beads was performed. Then, 2.0 g of hybrid beads A-2 thus obtained were dispersed in a mixture "toluene/pyridine/chlorotrimethylsilane/hexamethyldisilazane (16.7 ml/16.7 ml/0.31 ml/0.64 ml)", and the dispersion liquid was subjected to a reaction in an oil bath at 80° C. for 30 minutes so that the remaining silanol groups might be subjected to end capping. Hybrid beads A-3 thus obtained were washed with 1.95 g of acetone. As a result, 28 mg of the cellulose derivative were dissolved, but the organic substance ratio was kept at 45 wt % (confirmed by thermogravimetric analysis). The beads after the washing with acetone are defined as hybrid beads A-4. The resultant beads were observed with a scanning electron microscope (SEM) (JSM-5600 manufactured by JEOL Ltd.). As a result, it was found that none of the sizes and surface states of the beads showed a certain change even after the beads had been impregnated with acetone. FIG. 2 shows the SEM images of the hybrid beads A-4 before and after washing with acetone.

(1-4) Filling of Column

The hybrid beads A-4 thus obtained were subjected to particle size fractionation, and was then loaded into a stainless steel column having a length of 25 cm and an inner diameter of 0.2 cm by a slurry method, whereby a column-1 was obtained.

The column-1 had a number of theoretical plates (N) of 850.

(1-5) Evaluation for Optical Resolution Using HPLC

Figure 4:
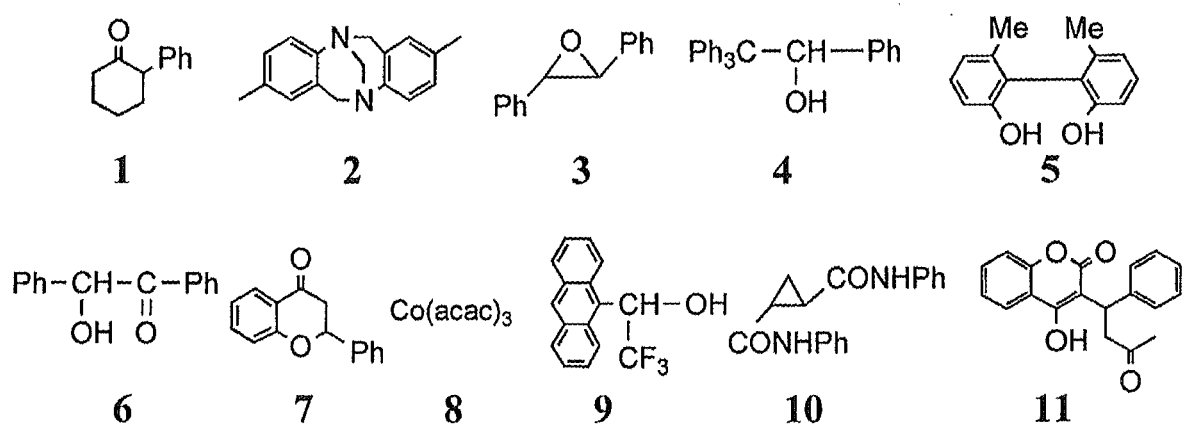
FIG. 4 is a view illustrating the structural formulae of compounds optically separated in the examples and comparative examples in which the numerical values described below the structural formulae correspond to the numerical values representing the kinds of racemic bodies described in Table 1.

As shown in FIG. 4, the optical resolution of ten kinds of racemic bodies (1 to 10) with the column-1 obtained by the above-mentioned operation (column temperature: about 20° C.) was performed. A HPLC pump (trade name: PU-980) manufactured by JASCO Corporation was used. The detection and identification of a peak were performed with a UV detector (wavelength: 254 nm, trade name: UV-970, manufactured by JASCO Corporation) and an optical rotation detector (trade name: OR-990, manufactured by JASCO Corporation) under the following conditions: a mixture hexane/2-propanol (90/10, v/v) was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene. It should be noted that conditions concerning, for example, HPLC and a detector used in the evaluation for optical resolution identical to those described above were used in the following examples and comparative examples.

Table 1 shows the results of the optical resolution with the column-1. Values in the table are a capacity ratio k1' and a separation factor α, and a sign in parentheses represents the optical activity of an enantiomer which was previously eluted.

It should be noted that the capacity ratio k1' and the separation factor α are defined by the following formulae. A capacity ratio and a separation factor were calculated in the following examples and comparative examples by using the same formulae.

Capacity ration $k1'k1'=[(\text{retention time of enantiomer})-(t_0)]/t_0$ [Eq. 4]

Separation factor $\alpha\alpha=(\text{capacity ration of enantiomer to be retained more strongly})/(\text{capacity ratio of enantiomer to be retained more weakly})$ [Eq. 5]

(1-6) Evaluation for Optical Resolving Ability by Supercritical Fluid Chromatography (SFC)

Figure 3:
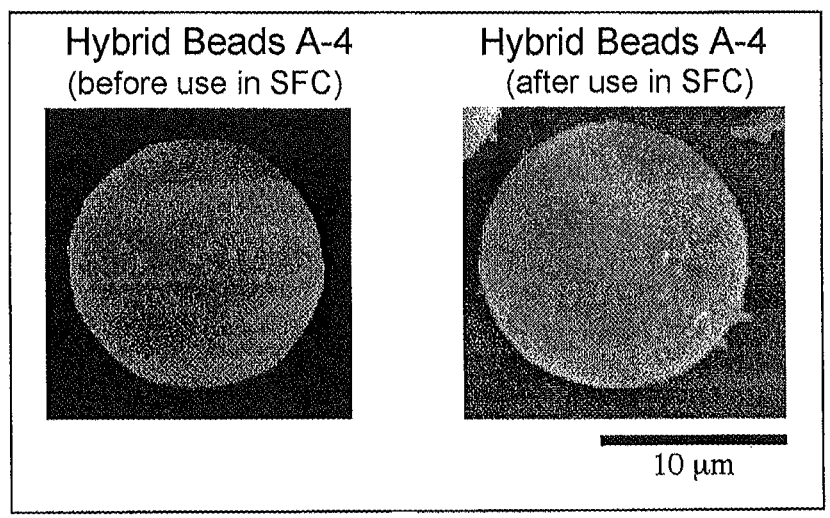
FIG. 3 shows secondary electron images (photographs) of beads of an example before and after use in SFC photographed with a scanning electron microscope.
Figure 5:
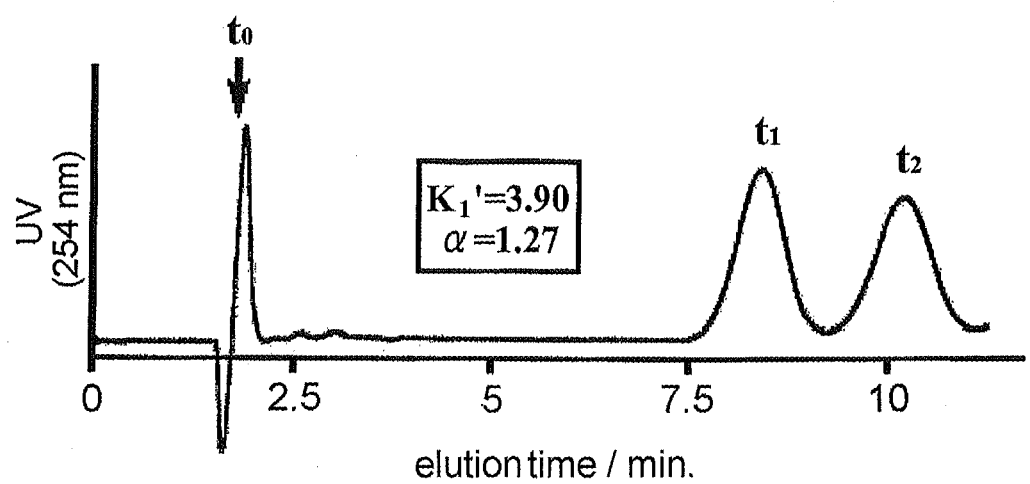
FIG. 5 is a view illustrating the results of the optical resolution of the molecules of warfarin (11) with a column obtained in Example 1.

The molecules of a racemic body 11 (warfarin) illustrated in FIG. 4 were optically separated by SFC with the column-1 obtained by the above operations. An SFC apparatus used includedpumps available under the product names of PU-2080 and PU-2086 from JASCO Corporation, a column thermostat available under the product name of CO-1560 from JASCO Corporation, and a back pressure controller available under the product name of 880-81 from JASCO Corporation. Carbon dioxide was used as an eluent, and ethanol was added as a modifier. The flow rates of carbon dioxide and ethanol were set to 0.5 ml/min and 0.1 ml/min, respectively, and a column temperature and a back pressure were set to 40° C. and 100 kg/cm$^2$, respectively. The detection and identification of a peak were performed with a UV detector (wavelength: 254 nm, product name: UV-2075, manufactured by JASCO Corporation). FIG. 5 illustrates the results of the optical resolution with the column-1. In addition, FIG. 3 illustrates the SEM images of the beads A-4 before and after use in supercritical fluid chromatography (SFC).

Example 2

(2-1) Synthesis of Cellulose 3,5-dimethylphenylcarbamate Having alkoxysilyl Groups First, 4.00 g (24.7 mmol) of dried cellulose were dissolved in a mixed solution of 120 ml of dehydrated N,N-dimethylacetamide, 60 ml of dehydrated pyridine, and 8.00 g of lithium chloride.

Figure 7:
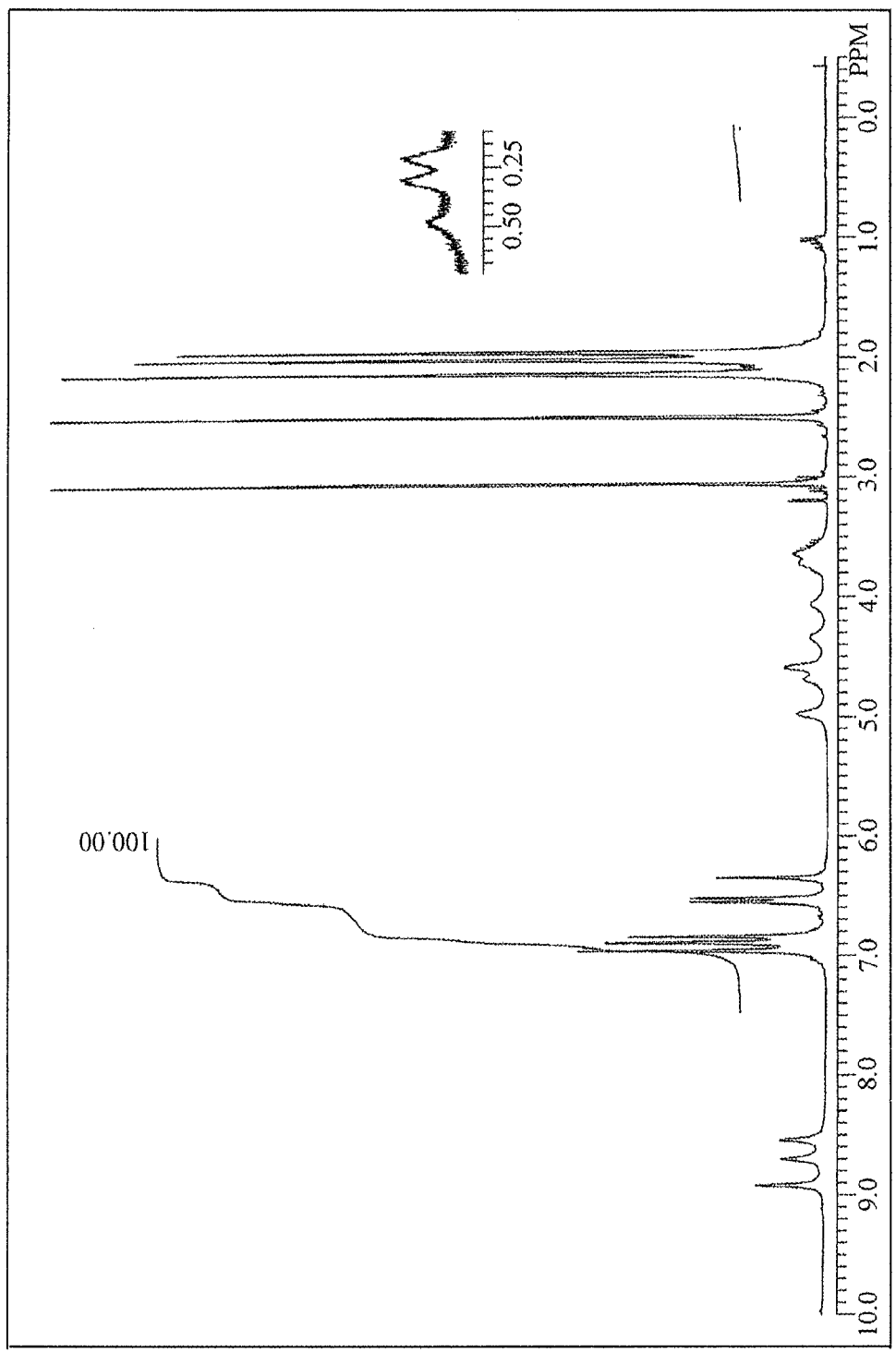
FIG. 7 is a view illustrating the $^1$H NMR spectrum of a cellulose 3,5-dimethylphenylcarbamate containing alkoxysilyl groups (derivative-B) at 80° C. in DMSO-$d_6$ obtained in Example 2.

Then, 9.08 g (61.8 mmol) of 3,5-dimethylphenyl isocyanate were added to the resultant solution, and the mixture was subjected to a reaction at 80° C. for 15 hours. After that, 0.34 g (1.4 mmol) of 3-isocyanatepropyltriethoxysilane was added to the resultant, and the mixture was subjected to a reaction at 80° C. for 12 hours. Further, 9.08 g (61.8 mmol) of 3,5-dimethylphenyl isocyanate were added to the resultant, and the mixture was subjected to a reaction at 80° C. for 11 hours. A pyridine soluble portion was dropped into methanol and recovered as an insoluble portion. After that, the portion was dried in a vacuum. As a result, 13.29 g of a cellulose 3,5-dimethylphenylcarbamate derivative B into which alkoxysilyl groups had been introduced were obtained. The results of $^1$H NMR confirmed that the introduction ratios of 3,5-dimethylphenyl isocyanate and the alkoxysilyl groups were 98.6% and 1.4%, respectively (see FIG. 7).

(2-2) Preparation of Cellulose Derivative Beads

First, 250 mg of the derivative B, 3.5 ml of tetraethoxysilane (TEOS), 1 ml of water, and 0.5 ml of chlorotrimethylsilane were dissolved in 30 ml of a mixed solvent containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was passed through a 20-μm filter so that beads each having a large particle diameter might be removed. The suspension after having been passed through the filter was subjected to suction filtration so that hybrid beads might be recovered. Then, the hybrid beads were washed with water and methanol. After the washing, the washed beads were dried in a vacuum. As a result, 285 mg of hybrid beads were obtained. As a result of the repetition of the foregoing operations, hybrid beads-B-1 each having a particle diameter of about 10 μm were recovered. The thermogravimetric analysis of the resultant hybrid beads-B-1 confirmed that an organic substance ratio was 55 wt %. A six-blade type disperser shaft and a one-liter beaker were used in the preparation of the beads.

Then, 0.75 g of the dried hybrid beads B-1 were dispersed in a mixture "ethanol/water/chlorotrimethylsilane (7.5 ml/1.9 ml/0.13 ml)", and the dispersion liquid was subjected to a reaction for 1 hour while being refluxed in an oil bath at 100° C. Thus, crosslinking in the beads was performed. Then, 0.6 g of hybrid beads B-2 thus obtained were dispersed in a mixture "toluene/pyridine/chlorotrimethylsilane/hexamethyldisilazane (5.0 ml/5.0 ml/1.25 ml/0.07 ml)", and the dispersion liquid was subjected to a reaction in an oil bath at 110° C. for 15 minutes so that the remaining silanol groups might be subjected to end capping. The beads thus obtained are hereby referred to as hybrid beads B-3. FIG. 2 shows the SEM images of the hybrid beads B-3.

(2-3) Filling of Column

The hybrid beads B-3 thus obtained were subjected to particle size fractionation, and was then loaded into a stainless steel column having a length of 25 cm and an inner diameter of 0.2 cm by a slurry method, whereby a column-2 was obtained.

The column-2 had a number of theoretical plates (N) of 1,100.

(2-4) Evaluation for Optical Resolution

As shown in FIG. 4, the optical resolution of ten kinds of racemic bodies (1 to 10) with the column-2 obtained by the above-mentioned operation was performed. The detection and identification of a peak were performed with a UV detector and an optical rotation detector under the following conditions: a mixture hexane/2-propanol (90/10, v/v) was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene. Table 1 shows the results of the optical resolution with the column-2. Values in the table are a capacity ratio k1' and a separation factor α, and a sign in parentheses represents the optical activity of an enantiomer which was previously eluted.

Example 3

(3-1) Synthesis of Cellulose 3,5-dimethylphenylcarbamate Having alkoxysilyl Groups First, 0.50 g (3.09 mmol) of dried cellulose was dissolved in a mixed solution of 15 ml of dehydrated N,N-dimethylacetamide, 7.5 ml of dehydrated pyridine, and 1.00 g of lithium chloride.

Figure 8:
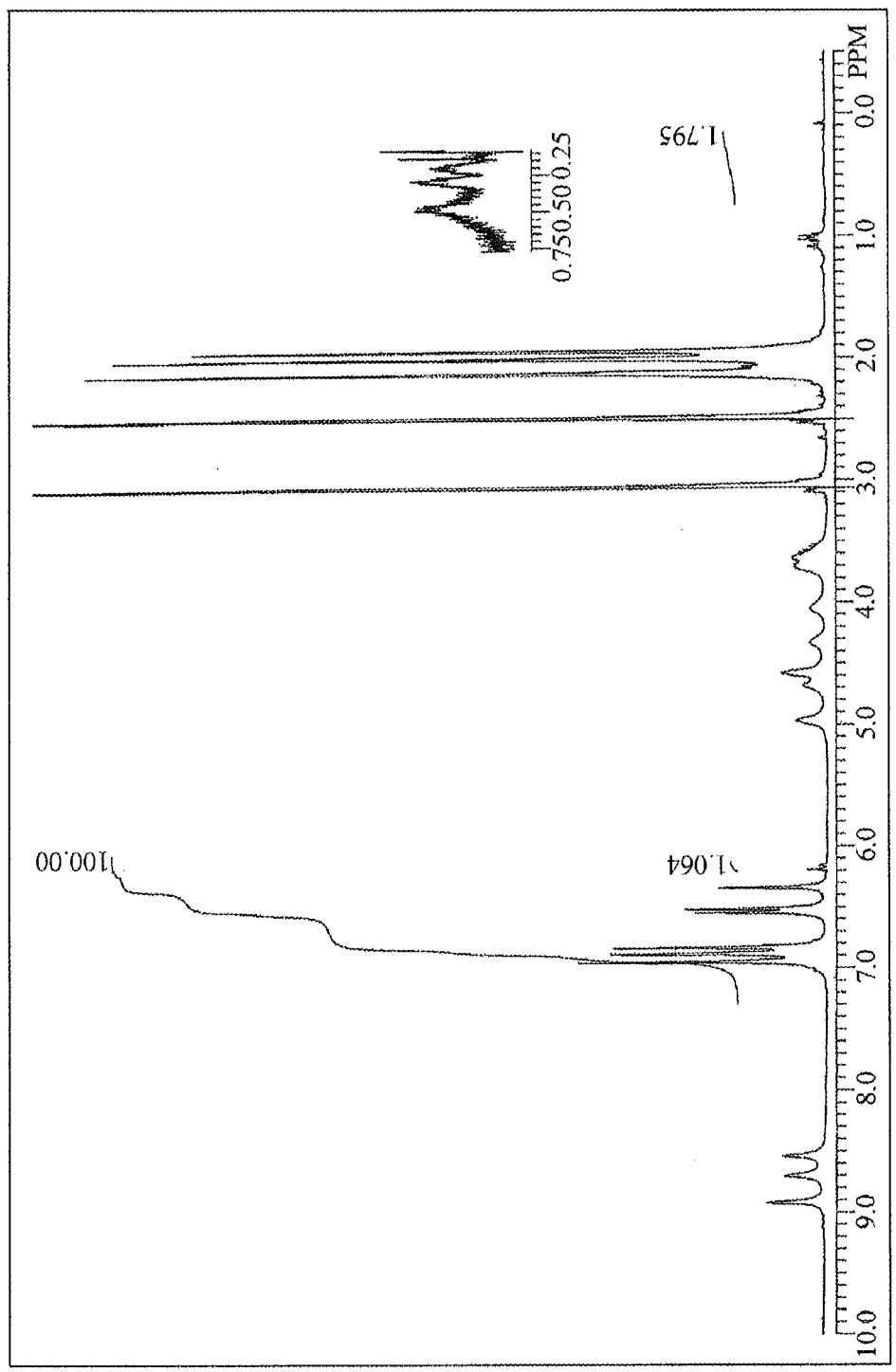
FIG. 8 is a view illustrating the $^1$H NMR spectrum of a cellulose 3,5-dimethylphenylcarbamate containing alkoxysilyl groups (derivative-C) at 80° C. in DMSO-$d_6$ obtained in Example 3.
Figure 9:
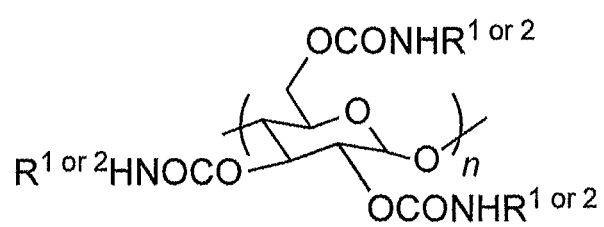
FIG. 9 is a view illustrating the structure of a polymer compound derivative (amylose derivative) obtained in Example 7.
Figure 9:
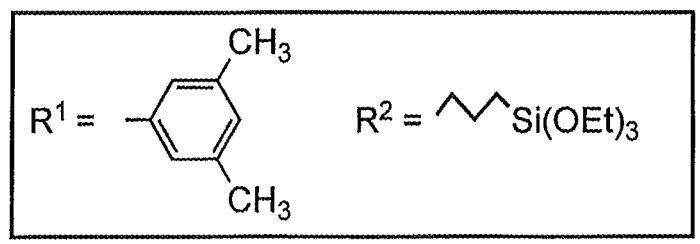

Then, 1.13 g (7.72 mmol) of 3,5-dimethylphenyl isocyanate were added to the resultant solution, and the mixture was subjected to a reaction at 80° C. for 6 hours. After that, 84 mg (0.34 mmol) of 3-isocyanatepropyltriethoxysilane was added to the resultant, and the mixture was subjected to a reaction at 80° C. for 13 hours. Further, 1.36 g (9.26 mmol) of 3,5-dimethylphenyl isocyanate were added to the resultant, and the mixture was subjected to a reaction at 80° C. for 7 hours. A pyridine soluble portion was dropped into methanol and recovered as an insoluble portion. After that, the portion was dried in a vacuum. As a result, 1.65 g of a cellulose 3,5-dimethylphenylcarbamate derivative C into which alkoxysilyl groups had been introduced were obtained. The results of $^1$H NMR confirmed that the introduction ratios of 3,5-dimethylphenyl isocyanate and the alkoxysilyl groups were 97.3% and 2.7%, respectively (see FIG. 8).

(3-2) Preparation of Cellulose Derivative Beads

First, 250 mg of the derivative C, 2.25 ml of tetraethoxysilane (TEOS), 1 ml of water, and 0.5 ml of chlorotrimethylsilane were dissolved in 30 ml of a mixed solvent containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was passed through a 20-μm filter so that beads each having a large particle diameter might be removed. The suspension after having been passed through the filter was subjected to suction filtration so that hybrid beads might be recovered. Then, the hybrid beads were washed with water and methanol. After the washing, the washed beads were dried in a vacuum. As a result, 297 mg of hybrid beads were obtained. As a result of the repetition of the foregoing operations, hybrid beads-C-1 each having a particle diameter of about 3 to 10 μm were recovered. The thermogravimetric analysis of the resultant hybrid beads-C-1 confirmed that an organic substance ratio was 62 wt %. A six-blade type disperser shaft and a one-liter beaker were used in the preparation of the beads.

Then, 0.85 g of the dried hybrid beads C-1 was dispersed in a mixture "ethanol/water/chlorotrimethylsilane (9.0 ml/2.25 ml/0.15 ml)", and the dispersion liquid was subjected to a reaction for 1 hour while being refluxed in an oil bath at 100° C. Thus, crosslinking in the beads was performed. Then, 0.7 g of hybrid beads C-2 thus obtained was dispersed in a mixture "toluene/pyridine/chlorotrimethylsilane/hexamethyldisilazane (5.0 ml/5.0 ml/0.08 ml/1.30 ml)", and the dispersion liquid was subjected to a reaction in an oil bath at 110° C. for 30 minutes so that the remaining silanol groups might be subjected to end capping. The beads thus obtained are hereby referred to as hybrid beads C-3. FIG. 2 shows the SEM images of the hybrid beads C-3.

(3-3) Filling of Column

The hybrid beads C-3 thus obtained were subjected to particle size fractionation, and was then loaded into a stainless steel column having a length of 25 cm and an inner diameter of 0.2 cm by a slurry method, whereby a column-3 was obtained.

The column-3 had a number of theoretical plates (N) of 200.

(3-4) Evaluation for Optical Resolution

As shown in FIG. 4, the optical resolution of ten kinds of racemic bodies (1 to 10) with the column-3 obtained by the above-mentioned operation was performed. The detection and identification of a peak were performed with a UV detector and an optical rotation detector under the following conditions: a mixture hexane/2-propanol (90/10, v/v) was used as an eluent, and its flow rate was 0.2 ml/min. It should be noted that the number of theoretical plates N was determined from the peak of benzene, and a time $t_0$ for which the eluent passed through the column was determined from the elution time of 1,3,5-tri-tert-butylbenzene. Table 1 shows the results of the optical resolution with the column-3. Values in the table are a capacity ratio k1' and a separation factor α, and a sign in parentheses represents the optical activity of an enantiomer which was previously eluted.

Example 4

The following experiment was performed in order that an organic substance content in beads when no polymer compound derivative was used might be calculated.

First, 5 ml of tetraethoxysilane (TEOS), 1 ml of water, and 0.5 ml of chlorotrimethylsilane were dissolved in 30 ml of a mixed solvent containing tetrahydrofuran/1-heptanol (4/1, v/v). After having been heated at 80° C. for 9 hours, the solution was dropped to 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour. The resultant suspension was subjected to suction filtration so that a silica gel-1 might be recovered. Then, the silica gel was washed with water and methanol. After the washing, the washed silica gel was dried in a vacuum. As a result, 360 mg of the silica gel-1 were obtained. The thermogravimetric analysis (SSC-5200, Seiko Instruments Inc.) of the resultant silica gel-1 confirmed that the organic substance ratio was 10 wt %. A six-blade type disperser shaft and a one-liter beaker were used in the preparation of the silica gel beads.

Example 5

(5-1) Synthesis of Cellulose 3,5-dimethylphenylcarbamate Having alkoxysilyl Groups First, 4.00 g (24.7 mmol) of dried cellulose were dissolved in a mixed solution of 120 ml of dehydrated N,N-dimethylacetamide, 60 ml of dehydrated pyridine, and 8.00 g of lithium chloride.

Then, 9.08 g (61.8 mmol) of 3,5-dimethylphenyl isocyanate were added to the resultant solution, and the mixture was subjected to a reaction at 80° C. for 11 hours. After that, 0.38 g (1.56 mmol) of 3-isocyanatepropyltriethoxysilane was added to the resultant, and the mixture was subjected to a reaction at 80° C. for 12 hours. Further, 12.7 g (86.4 mmol) of 3,5-dimethylphenyl isocyanate were added to the resultant, and the mixture was subjected to a reaction at 80° C. for 10 hours. A pyridine soluble portion was dropped into methanol and recovered as an insoluble portion. After that, the portion was dried in a vacuum. As a result, 12.9 g of a cellulose 3,5-dimethylphenylcarbamate derivative D into which alkoxysilyl groups had been introduced were obtained. The introduction ratios of 3,5-dimethylphenyl isocyanate and the alkoxysilyl groups were 98.3% and 1.7%, respectively (5-2) Preparation of Cellulose Derivative Beads First, 250 mg of the derivative D, 3 ml of tetraethoxysilane (TEOS), 1 ml of water, and 0.5 ml of chloromethylsilane were dissolved in 30 ml of a mixed solution containing tetrahydrofuran/1-heptanol (4/1, v/v). After having been heated at 80° C. for 9 hours, the solution was dropped into 500 ml of a 0.4% aqueous solution of trimethyloctadecylammonium chloride heated in a water bath at 80° C. while the aqueous solution was stirred with a disperser at a shaft revolution number of 1,100 rpm. After the dropping, the mixture was stirred at 80° C. for 1 hour, and the resultant suspension was subjected to suction filtration so that hybrid beads might be recovered. Then, the hybrid beads were washed with water and methanol. After the washing, the washed beads were dried in a vacuum. As a result, 1,452 mg of hybrid beads D-1 were obtained. As a result of the repetition of the foregoing operations, hybrid beads D-2 each having a particle diameter of about 10 μm were recovered. The thermogravimetric measurement (SSC-5200, Seiko Instruments Inc.) of the resultant hybrid beads D-2 confirmed that an organic substance ratio was 28 wt %. A six-blade type disperser shaft and a one-liter beaker were used in the preparation of the beads.

Then, 1.0 g of the dried hybrid beads D-2 was dispersed in a mixed solvent "toluene/pyridine/chlorotrimethylsilane/hexamethyldisilazane (15 ml/15 ml/0.20 ml/0.42 ml)", and the dispersion liquid was subjected to a reaction in an oil bath at 80° C. for 30 minutes so that the remaining silanol groups might be subjected to end capping. Hybrid beads D-3 thus obtained were washed with water and methanol. As a result, 1.02 g of the final product (hybrid beads D-4) were obtained. The organic substance ratio of the hybrid beads D-4 was 30%.

(5-3) Filling of Column

A column-4 was obtained by filling the same column as that of the above section (1-4) with the resultant hybrid beads D-4 by the same method as that described in the above section (1-4).

(5-4) Evaluation for Optical Resolving Ability

Evaluation for optical resolving ability was performed with the column-4 obtained by the above operations by the same method as that described in the above section (1-5). Table 2 shows the results of the evaluation.

Example 6

(6-1) Preparation of Cellulose Derivative Beads

First, 250 mg of the derivative D, 2 ml of tetraethoxysilane (TEOS), 1 ml of water, and 0.5 ml of chloromethylsilane were dissolved in 30 ml of a mixed solution containing tetrahydrofuran/1-heptanol (4/1, v/v). After having been heated at 80° C. for 9 hours, the solution was dropped into 500 ml of a 0.4% aqueous solution of trimethyloctadecylammonium chloride heated in a water bath at 80° C. while the aqueous solution was stirred with a disperser at a shaft revolution number of 1,100 rpm. After the dropping, the mixture was stirred at 80° C. for 1 hour, and the resultant suspension was subjected to suction filtration so that hybrid beads might be recovered. Then, the hybrid beads were washed with water and methanol. After the washing, the washed beads were dried in a vacuum. As a result, 1,054 mg of hybrid beads D-5 were obtained. As a result of the repetition of the foregoing operations, hybrid beads D-6 each having a particle diameter of about 10 μm were recovered. The thermogravimetric measurement (SSC-5200, Seiko Instruments Inc.) of the resultant hybrid beads D-6 confirmed that an organic substance ratio was 35 wt %. A six-blade type disperser shaft and a one-liter beaker were used in the preparation of the beads.

Then, 3.0 g of the dried hybrid beads D-6 were dispersed in a mixture "toluene/pyridine/hexamethyldisilazane (15 ml/15 ml/8.9 ml)", and the dispersion liquid was subjected to a reaction in an oil bath at 80° C. for 15 hours so that the remaining silanol groups might be subjected to end capping. Hybrid beads D-7 thus obtained were washed with water and methanol. As a result, 2.89 g of the final product (hybrid beads D-8) were obtained. The organic substance ratio of the hybrid beads D-8 was 34%.

(6-2) Filling of Column

The hybrid beads D-8 thus obtained were subjected to particle size fractionation, and was then loaded into a stainless steel column having a length of 25 cm and an inner diameter of 0.46 cm by a slurry method, whereby a column-5 was obtained.

(6-3) Evaluation for Optical Resolving Ability

Ten kinds of racemic bodies (1 to 10) illustrated in FIG. 4 were optically separated with the column-5 obtained by the above operations. A mixture containing hexane/2-propanol (90/10, v/v) was used as an eluent, and its flow rate was set to 1.0 ml/min. Then, the detection and identification of a peak were performed with the same UV detector and optical rotatory detector as those of the above section (1-5). Table 2 shows the results of the evaluation.

Example 7

(7-1) Synthesis of amylose 3,5-dimethylphenylcarbamate Having alkoxysilyl Groups First, 1.50 g (9.26 mmol) of dried amylose were dissolved in a mixed solution of 45 ml of dehydrated N,N-dimethylacetamide, 22.5 ml of dehydrated pyridine, and 3.00 g of lithium chloride.

Then, 3.41 g (23.2 mmol) of 3,5-dimethylphenyl isocyanate were added to the resultant solution, and the mixture was subjected to a reaction at 80° C. for 6 hours. After that, 0.16 g (0.65 mmol) of 3-isocyanatepropyltriethoxysilane was added to the resultant, and the mixture was subjected to a reaction at 80° C. for 13 hours. Further, 3.41 g (23.2 mmol) of 3,5-dimethylphenyl isocyanate were added to the resultant, and the mixture was subjected to a reaction at 80° C. for 10 hours. A pyridine soluble portion was dropped into methanol and recovered as an insoluble portion. After that, the portion was dried in a vacuum. As a result, 5.40 g of an amylose 3,5-dimethylphenylcarbamate derivative E into which alkoxysilyl groups had been introduced were obtained. The introduction ratios of 3,5-dimethylphenyl isocyanate and the alkoxysilyl groups were 98.3% and 1.7%, respectively.

(7-2) Preparation of Amylose Derivative Beads

First, 250 mg of the derivative E, 4 ml of tetraethoxysilane (TEOS), 1 ml of water, and 0.5 ml of chloromethylsilane were dissolved in 30 ml of a mixed solution containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was passed through a 20-μm filter so that beads each having a large particle diameter might be removed. The suspension after having been passed through the filter was subjected to suction filtration so that hybrid beads might be recovered. Then, the hybrid beads were washed with water and methanol. After the washing, the washed beads were dried in a vacuum. As a result, 1,775 mg of hybrid beads E-1 were obtained. As a result of the repetition of the foregoing operations, hybrid beads E-2 each having a particle diameter of about 10 μm were recovered. The thermogravimetric measurement (SSC-5200, Seiko Instruments Inc.) of the resultant hybrid beads E-2 confirmed that an organic substance ratio was 31 wt %. A six-blade type disperser shaft and a one-liter beaker were used in the preparation of the beads.

Then, 0.75 g of the dried hybrid beads E-2 were dispersed in 9.5 ml of a mixed solution "ethanol/water/chlorotrimethylsilane (6/1.5/0.1(v/v/v))", and the dispersion liquid was subjected to a reaction for 1 hour while being refluxed in an oil bath at 100° C. Thus, crosslinking in the beads was performed. Then, 0.70 g of hybrid beads E-3 thus obtained were dispersed in a mixture "toluene/pyridine/chlorotrimethylsilane/hexamethyldisilazane (5.8 ml/5.8 ml/0.28 ml/0.14 ml)", and the dispersion liquid was subjected to a reaction in an oil bath at 80° C. for 30 minutes so that the remaining silanol groups might be subjected to end capping. Hybrid beads E-4 thus obtained were washed with water and methanol. As a result, 0.68 g of the final product (hybrid beads E-5) were obtained.

(7-3) Filling of Column

A column-6 was obtained by filling the same column as that of the above section (1-4) with the resultant hybrid beads E-5 by the same method as that described in the above section (1-4).

(7-4) Evaluation for Optical Resolving Ability

Evaluation for optical resolving ability was performed with the column-6 obtained by the above operations by the same method as that described in the above section (1-5). Table 3 shows the results of the evaluation.

Example 8

(8-1) Preparation of Amylose Derivative Beads

First, 250 mg of the derivative E, 3 ml of tetraethoxysilane (TEOS), 1 ml of water, and 0.5 ml of chloromethylsilane were dissolved in 30 ml of a mixed solution containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was passed through a 20-μm filter so that beads each having a large particle diameter might be removed. The suspension after having been passed through the filter was subjected to suction filtration so that hybrid beads might be recovered. Then, the hybrid beads were washed with water and methanol. After the washing, the washed beads were dried in a vacuum. As a result, 0.61 mg of hybrid beads E-6 were obtained. As a result of the repetition of the foregoing operations, hybrid beads E-7 each having a particle diameter of about 10 μm were recovered. The thermogravimetric measurement (SSC-5200, Seiko Instruments Inc.) of the resultant hybrid beads E-7 confirmed that an organic substance ratio was 48 wt %. A six-blade type disperser shaft and a one-liter beaker were used in the preparation of the beads.

Then, 0.60 g of the dried hybrid beads E-7 were dispersed in 7.6 ml of a mixed solution "ethanol/water/chlorotrimethylsilane (6/1.5/0.1(v/v/v))", and the dispersion liquid was subjected to a reaction for 1 hour while being refluxed in an oil bath at 100° C. Thus, crosslinking in the beads was performed. Then, 0.58 g of hybrid beads E-8 thus obtained were dispersed in a mixture "toluene/pyridine/chlorotrimethylsilane/hexamethyldisilazane (4.8 ml/4.8 ml/0.18 ml/0.09 ml)", and the dispersion liquid was subjected to a reaction in an oil bath at 80° C. for 30 minutes so that the remaining silanol groups might be subjected to end capping. Hybrid beads E-9 thus obtained were washed with water and methanol. As a result, 0.55 g of the final product (hybrid beads E-10) were obtained.

(8-2) Filling of Column

A column-7 was obtained by filling the same column as that of the above section (1-4) with the resultant hybrid beads E-10 by the same method as that described in the above section (1-4).

(8-3) Evaluation for Optical Resolving Ability

Evaluation for optical resolving ability was performed with the column-7 obtained by the above operations by the same method as that described in the above section (1-5). Table 3 shows the results of the evaluation.

Example 9

(9-1) Synthesis of Cellulose 3,5-dimethylphenylcarbamate Having alkoxysilyl Groups First, 8.00 g (49.4 mmol) of dried cellulose were dissolved in a mixed solution of 240 ml of dehydrated N,N-dimethylacetamide, 120 ml of dehydrated pyridine, and 16.0 g of lithium chloride.

Then, 18.2 g (124 mmol) of 3,5-dimethylphenyl isocyanate were added to the resultant solution, and the mixture was subjected to a reaction at 80° C. for 6 hours. After that, 0.73 g (2.97 mmol) of 3-isocyanatepropyltriethoxysilane was added to the resultant, and the mixture was subjected to a reaction at 80° C. for 12 hours. Further, 25.4 g (173 mmol) of 3,5-dimethylphenyl isocyanate were added to the resultant, and the mixture was subjected to a reaction at 80° C. for 8 hours. A pyridine soluble portion was dropped into methanol and recovered as an insoluble portion. After that, the portion was dried in a vacuum. As a result, 25.1 g of a cellulose 3,5-dimethylphenylcarbamate derivative F into which alkoxysilyl groups had been introduced were obtained. The introduction ratios of 3,5-dimethylphenyl isocyanate and the alkoxysilyl groups were 98.3% and 1.7%, respectively.

(9-2) Preparation of Cellulose Derivative Beads

First, 250 mg of the derivative F, 1 ml of tetraethoxysilane (TEOS), 0.83 ml of 1,2-bistriethoxysilylethane (BTSE), 1 ml of water, and 0.5 ml of chloromethylsilane were dissolved in 30 ml of a mixed solution containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was subjected to suction filtration so that hybrid beads might be recovered. Then, the hybrid beads were washed with water and methanol. After the washing, the washed beads were dried in a vacuum. As a result, 680 mg of hybrid beads F-1 were obtained. As a result of the repetition of the foregoing operations, hybrid beads F-2 each having a particle diameter of about 10 μm were recovered. The thermogravimetric measurement (SSC-5200, Seiko Instruments Inc.) of the resultant hybrid beads F-2 confirmed that an organic substance ratio was 48 wt %. A six-blade type disperser shaft and a one-liter beaker were used in the preparation of the beads.

(9-3) Filling of Column

A column-8 was obtained by filling the same column as that of the above section (1-4) with the resultant hybrid beads F-2 by the same method as that described in the above section (1-4).

(9-4) Evaluation for Optical Resolving Ability

Evaluation for optical resolving ability was performed with the column-8 obtained by the above operations by the same method as that described in the above section (1-5). Table 4 shows the results of the evaluation.

Example 10

(10-1) Preparation of Cellulose Derivative Beads

First, 250 mg of the derivative F, 1.5 ml of tetraethoxysilane (TEOS), 0.42 ml of 1,2-bistriethoxysilylethane (BTSE), 1 ml of water, and 0.5 ml of chloromethylsilane were dissolved in 30 ml of a mixed solution containing tetrahydrofuran/1-heptanol (4/1, v/v). After having been heated at 80° C. for 9 hours, the solution was dropped into 500 ml of a 0.2% aqueous solution of sodium dodecylsulfate heated in a water bath at 80° C. while the aqueous solution was stirred with a disperser at a shaft revolution number of 1,100 rpm. After the dropping, the mixture was stirred at 80° C. for 1 hour, and the resultant suspension was subjected to suction filtration so that hybrid beads might be recovered. Then, the hybrid beads were washed with water and methanol. After the washing, the washed beads were dried in a vacuum. As a result, 547 mg of hybrid beads F-3 were obtained. As a result of the repetition of the foregoing operations, hybrid beads F-4 each having a particle diameter of about 10 μm were recovered. The thermogravimetric measurement (SSC-5200, Seiko Instruments Inc.) of the resultant hybrid beads F-4 confirmed that an organic substance ratio was 55 wt %. A six-blade type disperser shaft and a one-liter beaker were used in the preparation of the beads.

(10-2) Filling of Column

A column-9 was obtained by filling the same column as that of the above section (1-4) with the resultant hybrid beads F-4 by the same method as that described in the above section (1-4).

(10-3) Evaluation for Optical Resolving Ability

Evaluation for optical resolving ability was performed with the column-9 obtained by the above operations by the same method as that described in the above section (1-5). Table 4 shows the results of the evaluation.

TABLE 1

| Racemic body | Column-1 | | Column-2 | | Column-3 | |
|---|---|---|---|---|---|---|
| | $k_1'$ | α | $k_1'$ | α | $k_1'$ | α |
| 1 | 1.90(−) | 1.25 | 2.29(−) | 1.26 | 2.17(−) | 1.24 |
| 2 | 1.47(+) | 1.53 | 1.61(+) | 1.73 | 1.52(+) | 1.63 |
| 3 | 1.10(−) | 1.30 | 1.29(−) | 1.46 | 1.28(−) | 1.40 |
| 4 | 1.84(+) | 1.24 | 2.47(+) | 1.17 | 2.67(+) | 1.12 |
| 5 | 2.44(−) | 3.49 | 2.85(−) | 3.59 | 2.89(−) | 3.22 |
| 6 | 3.91(+) | 1.24 | 4.52(+) | 1.29 | 4.41(+) | 1.27 |
| 7 | 2.20(−) | 1.17 | 2.53(−) | 1.20 | 2.64(−) | 1.14 |

TABLE 1-continued

| Racemic body | Column-1 | | Column-2 | | Column-3 | |
|---|---|---|---|---|---|---|
| | $k_1'$ | α | $k_1'$ | α | $k_1'$ | α |
| 8 | 0.71(+) | ~1 | 0.71(+) | 1.17 | 0.90(+) | ~1 |
| 9 | 2.14(−) | 2.07 | 2.58(−) | 2.17 | 2.82(−) | 2.15 |
| 10 | 1.63(+) | ~1 | 1.62(+) | 1.26 | 2.15 | 1.0 |

Eluent: Hexane/2-propanol (90/10, v/v), Column: 25 0.20 cm (i.d.) Flow rate: 0.20 ml/min.

TABLE 2

| Racemic body | Column-4 | | Column-5 | |
|---|---|---|---|---|
| | $k_1'$ | α | $k_1'$ | α |
| 1 | 1.89(−) | ~1 | 1.35(−) | 1.17 |
| 2 | 1.49(+) | ~1 | 1.59(+) | 1.28 |
| 3 | 0.90(+) | ~1 | 0.74(−) | 1.31 |
| 4 | 1.45 | 1.0 | 1.19(+) | 1.15 |
| 5 | 2.01(−) | 2.79 | 1.64(−) | 3.14 |
| 6 | 3.59(+) | ~1 | 2.26(+) | 1.24 |
| 7 | 2.07 | 1.0 | 1.36(−) | 1.19 |
| 8 | 0.57 | 1.0 | 0.82(+) | ~1 |
| 9 | 1.77(−) | 1.71 | 1.39(−) | 2.23 |
| 10 | 1.02 | 1.0 | 0.97(+) | 1.31 |

Column-4: Eluent, Hexane/2-propanol (90/10, v/v), Column: 25 0.20 cm (i.d.) Flow rate: 0.20 ml/min
Column-5: Eluent, hexane/2-propanol (90/10, v/v), Column: 25 0.46 cm (i.d.) Flow rate: 1.0 ml/min

TABLE 3

| Racemic body | Column-6 | | Column-7 | |
|---|---|---|---|---|
| | $k_1'$ | α | $k_1'$ | α |
| 1 | ~0 | 1.0 | 0.76(−) | ~1 |
| 2 | 0.79(+) | ~1 | 0.78(+) | 1.40 |
| 3 | 0.35(+) | 2.20 | 0.48(+) | 2.28 |
| 4 | 1.44(+) | 1.99 | 2.04(+) | 1.94 |
| 5 | 1.59(−) | 2.05 | 2.26(+) | 2.07 |
| 6 | 2.40(−) | ~1 | 3.19(−) | 1.08 |
| 7 | 0.85(+) | ~1 | 1.13(+) | 1.13 |
| 8 | 0.23 | ~1 | 0.31(−) | ~1 |
| 9 | 0.79(+) | 1.0 | 1.18(+) | 1.0 |
| 10 | 2.29(+) | 1.49 | 3.38(+) | 1.76 |

Eluent: Hexane/2-propanol (90/10, v/v), Column: 25 0.20 cm (i.d.)
Flow rate: 0.20 ml/min.

TABLE 4

| Racemic body | Column-8 | | Column-9 | |
|---|---|---|---|---|
| | $k_1'$ | α | $k_1'$ | α |
| 1 | 4.09 | ~1 | 3.24(−) | ~1 |
| 2 | 6.87 | 1.0 | 5.52(+) | ~1 |
| 3 | 1.91(−) | 2.30 | 1.72(−) | 2.35 |
| 4 | 2.58 | 1.0 | 3.14 | 1.0 |
| 5 | 3.17(−) | 1.67 | 3.26(−) | 1.97 |
| 6 | 7.45(+) | 1.25 | 6.27(+) | 1.36 |
| 7 | 4.54 | 1.0 | 3.71(−) | 1.18 |
| 8 | 4.54 | 1.0 | 4.02 | 1.0 |
| 9 | 4.30(−) | 2.23 | 4.60(−) | 2.33 |
| 10 | 2.56 | 1.0 | 2.87 | 1.0 |

Eluent: Hexane/2-propanol (90/10, v/v), Column: 25 0.20 cm (i.d.)
Flow rate: 0.20 ml/min.

What is claimed is:

1. A method of producing a complex, the method comprising the steps of:
dissolving the following (A) and (B) in an organic solvent to prepare a solution,
wherein (A) is a polysaccharide derivative obtained by modifying part of hydroxy or amino groups of a polysaccharide having a number average degree of polymerization of at least 5 with a compound represented by the following general formula (I),
wherein (B) is one or more kinds of compounds selected from tetraethoxysilane, tetramethoxysilane, tetra-n-propoxysilane, tetraisopropoxysilane, tetra-n-butoxysilane, tetraisobutoxysilane, tetra-sec-butoxysilane, tetra-t-butoxysilane, tetrapentyloxysilane, tetrahexyloxysilane, triethoxymethylsilane, triethoxyphenylsilane, compounds represented by the following general formula (III), compounds represented by the following general formula (IV), and compounds represented by the following general formula (V); and
dropping the solution into an aqueous solution of a surfactant or a proton-donating solvent while stirring the aqueous solution or the solvent:

$$A-X-Si(Y)_n R_{3-n} \quad (I)$$

where A represents a reactive group which reacts with a hydroxy or amino group, X represents an alkylene group which has 1 to 18 carbon atoms and which may have a branch, or an arylene group which may have a substituent, Y represents a reactive group which reacts with a silanol group to form a siloxane bond, R represents an alkyl group which has 1 to 18 carbon atoms and which may have a branch, or an aryl group which may have a substituent, and n represents an integer of 1 to 3;

$$Al(OR^1)_p R^2_{3-p} \quad (III)$$

$$Mg(OR^1)_q R^2_{2-q} \quad (IV)$$

where Al represents aluminum, Mg represents magnesium, $R^1$ represents hydrogen or an alkyl group having 1 to 12 carbon atoms, $R^2$ represents an alkyl group which has 1 to 18 carbon atoms and which may have a branch or an aryl group which may have a substituent, p represents an integer of 1 to 3, and q represents an integer of 1 or 2;

$$[Si(OR^3)_n R^4_{3-n}]-(X)-[Si(OR^5)_n R^6_{3-n}] \quad (V)$$

where $R^3$, $R^4$, $R^5$, and $R^6$ each independently represent an alkyl group which has 1 to 18 carbon atoms and which may have a branch or an aryl group which may have a substituent, and X represents an alkylene group which has 1 to 18 carbon atoms and which may have a branch or an arylene group which may have a substituent.

2. The method according to claim 1, wherein the polysaccharide is cellulose or amylose.

3. The method according to claim 1, wherein the compound represented by the general formula (I) is
3-isocyanatepropyltriethoxysilane,
3-isocyanatepropyltrimethoxysilane,
3-isocyanatepropyldiethoxymethylsilane,
2-isocyanateethyltriethoxysilane,
4-isocyanatephenyltriethoxysilane,
3-glycidoxypropyltrimethoxysilane,
3-glycidoxypropyltriethoxysilane, or
3-thiocyanatepropyltriethoxysilane.

4. The method according to claim 1, wherein a numerical value obtained by multiplying a ratio of the sum of the numbers of hydroxy groups and amino groups modified with the molecules of the compound represented by the general formula (I) to the sum of the total number of the hydroxy and the total number of the amino groups by 100% is 1.0 to 35%.

5. The method according to claim 1, wherein at least part of the hydroxy or amino groups of the polysaccharide, except the hydroxy or amino groups of the polysaccharide modified with the molecules of the compound represented by the general formula (I), are further modified with molecules of a compound having a functional group selected from a group containing an aromatic group, which optionally may have a substituent, and an aliphatic group having a cyclic structure.

6. The method according to claim 5, wherein the molecules of the compound having a functional group are introduced into the at least part of the hydroxy or amino groups of the polysaccharide, except the hydroxy or amino groups of the polysaccharide modified with the molecules of the compound represented by the general formula (I), through a urethane bond, a urea bond, an ester bond, or an ether bond.

7. The method according to claim 5, wherein the compound having a functional group comprises a compound containing an atomic group represented by the following general formula (VI) or (VII):

$$-CO-R' \quad (VI)$$

$$-CO-NH-R' \quad (VII)$$

where R' represents an aliphatic or aromatic hydrocarbon group which may contain a heteroatom, and the aliphatic or aromatic hydrocarbon group may be unsubstituted or may be substituted with one or more groups selected from the group consisting of a hydrocarbon group which has 1 to 12 carbon atoms and which may contain a heteroatom, a cyano group, a halogen, a hydroxy group, a nitro group, an amino group, and a dialkylamino group containing two alkyl groups each having 1 to 8 carbon atoms.

8. The method according to claim 7, wherein the compound having a functional group is 3,5-dimethylphenyl isocyanate.

9. The method according to claim 1, wherein a content of the polysaccharide derivative is 10 to 90 wt % with respect to a total amount of the complex.

10. The method according to claim 1, wherein the compounds represented by the general formula (V) comprise one or more compounds selected from the group consisting of bis(trimethoxysilyl)methane, bis(triethoxysilyl)methane, 1,1-bis(trimethoxysilyl)ethane, 1,1-bis(triethoxysilyl)ethane, 1,2-bis(trimethoxysilyl)ethane, 1,3-bis(trimethoxysilyl)propane, 1,3-bis(triethoxysilyl)propane, 2,2-bis(trimethoxysilyl)propane, 2,2-bis(triethoxysilyl)propane, 1,4-bis(trimethoxysilyl)benzene, 1,4-bis(triethoxysilyl)benzene, and 1,2-bistriethoxysilylethane.

11. The method according to claim 1, wherein the complex is in a bead form.

* * * * *